(12) United States Patent
Everhart

(10) Patent No.: US 10,380,374 B2
(45) Date of Patent: *Aug. 13, 2019

(54) SYSTEM AND METHOD FOR PREVENTING IDENTITY THEFT OR MISUSE BY RESTRICTING ACCESS

(71) Applicant: JPMorgan Chase Bank, N.A., New York, NY (US)

(72) Inventor: Glenn C. Everhart, Smyrna, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 1291 days.

This patent is subject to a terminal disclaimer.

(21) Appl. No.: 14/499,781

(22) Filed: Sep. 29, 2014

(65) Prior Publication Data

US 2015/0052059 A1 Feb. 19, 2015

Related U.S. Application Data

(63) Continuation of application No. 11/900,982, filed on Sep. 14, 2007, now Pat. No. 8,849,716, which is a (Continued)

(51) Int. Cl.
*G06F 21/62* (2013.01)
*H04N 7/173* (2011.01)
(Continued)

(52) U.S. Cl.
CPC ....... *G06F 21/6245* (2013.01); *G06Q 50/265* (2013.01); *H04L 63/0428* (2013.01);
(Continued)

(58) Field of Classification Search
CPC ...... G06F 21/62–6236; G06F 21/6245; G06Q 2220/10; G06Q 50/265
See application file for complete search history.

(56) References Cited

U.S. PATENT DOCUMENTS 2,405,500 A 8/1946 Guanella
3,665,162 A 5/1972 Yamamoto et al.
(Continued)

FOREIGN PATENT DOCUMENTS

CA 2430549 6/2002
DE 19731293 1/1999
(Continued)

OTHER PUBLICATIONS

Bruce Schneier, "Applied Cryptography", Copyright 1996, John Wiley & Sons, Inc. Second Edition.*
(Continued)

*Primary Examiner* — Steven S Kim
(74) *Attorney, Agent, or Firm* — Hunton Andrews Kurth LLP

(57) ABSTRACT

A system and method for network file filtering to prevent identity theft or misuse by restricting access to files likely to contain sensitive data is disclosed. The file filtering process includes scanning at least one data file for density of a selected pattern. Files identified as containing the selected pattern may be further analyzed to determine the likelihood of the presence of sensitive information. The process may also include restricting access to files that are identified as likely to contain sensitive information.

18 Claims, 4 Drawing Sheets

Related U.S. Application Data continuation-in-part of application No. 10/126,920, filed on Apr. 19, 2002, now Pat. No. 7,272,857.

(60) Provisional application No. 60/284,940, filed on Apr. 20, 2001.

(51) Int. Cl.
  *H04L 29/06* (2006.01)
  *G06Q 50/26* (2012.01)

(52) U.S. Cl.
  CPC ............. *H04L 63/10* (2013.01); *H04N 7/173* (2013.01); *G06Q 2220/10* (2013.01)

(56) References Cited

U.S. PATENT DOCUMENTS

| | | |
|---|---|---|
| 3,705,385 A | 12/1972 | Betz |
| 3,860,870 A | 1/1975 | Furuya |
| 3,896,266 A | 7/1975 | Waterbury |
| 3,938,090 A | 2/1976 | Borison et al. |
| 3,938,091 A | 2/1976 | Atalla et al. |
| 4,013,962 A | 3/1977 | Beseke et al. |
| 4,123,747 A | 10/1978 | Lancto et al. |
| 4,160,120 A | 7/1979 | Barnes et al. |
| 4,200,770 A | 4/1980 | Hellman et al. |
| 4,223,403 A | 9/1980 | Konheim et al. |
| 4,249,180 A | 2/1981 | Eberle et al. |
| 4,255,811 A | 3/1981 | Alder |
| 4,302,810 A | 11/1981 | Bouricius et al. |
| 4,316,055 A | 2/1982 | Feistel |
| 4,319,336 A | 3/1982 | Andersen et al. |
| 4,321,672 A | 3/1982 | Braun et al. |
| 4,405,829 A | 9/1983 | Rivest et al. |
| 4,453,074 A | 6/1984 | Weinstein |
| 4,454,414 A | 6/1984 | Benton |
| 4,471,164 A | 9/1984 | Henry |
| 4,523,087 A | 6/1985 | Benton |
| 4,529,870 A | 7/1985 | Chaum |
| 4,567,359 A | 1/1986 | Lockwood |
| 4,575,621 A | 3/1986 | Dreifus |
| 4,605,820 A | 8/1986 | Campbell, Jr. |
| 4,605,844 A | 8/1986 | Haggan |
| 4,614,861 A | 9/1986 | Pavlov et al. |
| 4,633,397 A | 12/1986 | Macco |
| 4,641,239 A | 2/1987 | Takesako |
| 4,650,981 A | 3/1987 | Foletta |
| 4,661,658 A | 4/1987 | Matyas |
| 4,663,500 A | 5/1987 | Okamoto et al. |
| 4,695,880 A | 9/1987 | Johnson et al. |
| 4,696,491 A | 9/1987 | Stenger |
| 4,697,072 A | 9/1987 | Kawana |
| 4,701,601 A | 10/1987 | Francini et al. |
| 4,713,760 A | 12/1987 | Yamada et al. |
| 4,713,761 A | 12/1987 | Sharpe et al. |
| 4,723,246 A | 2/1988 | Weldon, Jr. |
| 4,725,719 A | 2/1988 | Oncken et al. |
| 4,745,468 A | 5/1988 | Von Kohorn |
| 4,747,050 A | 5/1988 | Brachtl et al. |
| 4,747,139 A | 5/1988 | Taaffe |
| 4,752,676 A | 6/1988 | Leonard et al. |
| 4,799,156 A | 1/1989 | Shavit |
| 4,801,787 A | 1/1989 | Suzuki |
| 4,823,264 A | 4/1989 | Deming |
| 4,845,347 A | 7/1989 | McCrindle |
| 4,859,837 A | 8/1989 | Halpern |
| 4,868,877 A | 9/1989 | Fischer |
| 4,877,947 A | 10/1989 | Masu et al. |
| 4,882,675 A | 11/1989 | Nichtberger et al. |
| 4,890,324 A | 12/1989 | Jansen |
| 4,891,503 A | 1/1990 | Jewell |
| 4,926,255 A | 5/1990 | Von Kohorn |
| 4,941,090 A | 7/1990 | McCarthy |
| 4,964,043 A | 10/1990 | Galvin |
| 4,965,568 A | 10/1990 | Atalla et al. |
| 4,977,501 A | 12/1990 | Lefevre |
| 4,980,913 A | 12/1990 | Skret |
| 4,984,272 A | 1/1991 | McIlroy et al. |
| 4,992,940 A | 2/1991 | Dworkin |
| 5,001,755 A | 3/1991 | Skret |
| 5,005,200 A | 4/1991 | Fischer |
| 5,016,270 A | 5/1991 | Katz |
| 5,016,274 A | 5/1991 | Micali et al. |
| 5,018,196 A | 5/1991 | Takaragi et al. |
| 5,023,782 A | 6/1991 | Lutz et al. |
| 5,025,372 A | 6/1991 | Burton et al. |
| 5,050,207 A | 9/1991 | Hitchcock |
| 5,054,067 A | 10/1991 | Moroney et al. |
| 5,056,019 A | 10/1991 | Schultz et al. |
| 5,072,380 A | 12/1991 | Randelman et al. |
| 5,084,816 A | 1/1992 | Boese |
| 5,097,115 A | 3/1992 | Ogasawara et al. |
| 5,117,355 A | 5/1992 | McCarthy |
| 5,122,950 A | 6/1992 | Mee |
| 5,157,717 A | 10/1992 | Hitchcock |
| 5,161,244 A | 11/1992 | Maurer |
| 5,163,098 A | 11/1992 | Dahbura |
| 5,175,682 A | 12/1992 | Higashiyama |
| 5,189,606 A | 2/1993 | Burns et al. |
| 5,196,840 A | 3/1993 | Leith et al. |
| 5,202,826 A | 4/1993 | McCarthy |
| 5,212,792 A | 5/1993 | Gerety et al. |
| 5,220,501 A | 6/1993 | Lawlor |
| 5,225,664 A | 7/1993 | Iijima |
| 5,231,569 A | 7/1993 | Myatt et al. |
| 5,231,668 A | 7/1993 | Kravitz |
| 5,233,654 A | 8/1993 | Harvey et al. |
| 5,235,509 A | 8/1993 | Mueller et al. |
| 5,237,620 A | 8/1993 | Deaton |
| 5,241,594 A | 8/1993 | Kung |
| 5,253,294 A | 10/1993 | Maurer |
| 5,257,486 A | 11/1993 | Holmwall |
| 5,265,008 A | 11/1993 | Benton et al. |
| 5,265,033 A | 11/1993 | Vajk |
| 5,267,314 A | 11/1993 | Stambler |
| 5,276,311 A | 1/1994 | Hennige |
| 5,367,572 A | 1/1994 | Weiss |
| 5,287,268 A | 2/1994 | McCarthy |
| 5,297,026 A | 3/1994 | Hoffman |
| 5,302,810 A | 4/1994 | Gauthier et al. |
| 5,305,456 A | 4/1994 | Boitana |
| 5,311,594 A | 5/1994 | Penzias |
| 5,315,504 A | 5/1994 | Lembie |
| 5,317,683 A | 5/1994 | Hager et al. |
| 5,319,710 A | 6/1994 | Atalla et al. |
| 5,321,841 A | 6/1994 | East |
| 5,341,428 A | 8/1994 | Schatz |
| 5,351,186 A | 9/1994 | Bullock |
| 5,351,187 A | 9/1994 | Hassett |
| 5,352,877 A | 10/1994 | Morley |
| 5,381,332 A | 1/1995 | Wood |
| 5,382,784 A | 1/1995 | Eberhardt |
| 5,430,644 A | 4/1995 | Deaton et al. |
| 5,412,708 A | 5/1995 | Katz |
| 5,412,730 A | 5/1995 | Jones |
| 5,420,405 A | 5/1995 | Chasek |
| 5,428,684 A | 6/1995 | Akiyama et al. |
| 5,432,326 A | 7/1995 | Noblett et al. |
| 5,446,740 A | 8/1995 | Yien |
| 5,448,471 A | 9/1995 | Deaton et al. |
| 5,450,134 A | 9/1995 | Legate |
| 5,450,491 A | 9/1995 | McNair |
| 5,450,537 A | 9/1995 | Hirai et al. |
| 5,465,206 A | 11/1995 | Hilt et al. |
| 5,466,920 A | 11/1995 | Nair et al. |
| 5,467,269 A | 11/1995 | Flaten |
| 5,469,576 A | 11/1995 | Dauerer et al. |
| 5,473,143 A | 12/1995 | Vak |
| 5,473,732 A | 12/1995 | Chang |
| 5,479,530 A | 12/1995 | Nair et al. |
| 5,483,444 A | 1/1996 | Malark |
| 5,485,370 A | 1/1996 | Moss et al. |
| 5,495,981 A | 3/1996 | Warther |
| 5,500,890 A | 3/1996 | Rogge et al. |

(56) References Cited

U.S. PATENT DOCUMENTS

| | | |
|---|---|---|
| 5,502,636 A | 3/1996 | Clarke |
| 5,511,117 A | 4/1996 | Zazzera |
| 5,513,102 A | 4/1996 | Auriemma |
| 5,524,073 A | 6/1996 | Stambler |
| 5,532,689 A | 7/1996 | Bueno |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,539,825 A | 7/1996 | Akiyama et al. |
| 5,541,583 A | 7/1996 | Mandelbaum |
| 5,544,086 A | 8/1996 | Davis et al. |
| 5,546,452 A | 8/1996 | Andrews |
| 5,550,734 A | 8/1996 | Tater |
| 5,551,021 A | 8/1996 | Harada |
| 5,555,303 A | 9/1996 | Stambler |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,583,933 A | 12/1996 | Mark |
| 5,590,038 A | 12/1996 | Pitroda |
| 5,590,197 A | 12/1996 | Chen |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakely et al. |
| 5,606,496 A | 2/1997 | D'Agostino |
| 5,611,052 A | 3/1997 | Dykstra |
| 5,615,277 A | 3/1997 | Hoffman |
| 5,617,474 A | 4/1997 | Ditzig et al. |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,649,114 A | 4/1997 | Deaton et al. |
| 5,634,101 A | 5/1997 | Blau |
| 5,642,485 A | 5/1997 | Deaton et al. |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,644,723 A | 7/1997 | Deaton et al. |
| 5,644,778 A | 7/1997 | Burks et al. |
| 5,646,998 A | 7/1997 | Stambler |
| 5,652,786 A | 7/1997 | Rogers |
| 5,653,914 A | 8/1997 | Holmes et al. |
| 5,657,383 A | 8/1997 | Gerber |
| 5,657,390 A | 8/1997 | Elgamal et al. |
| 5,659,165 A | 8/1997 | Jennings |
| 5,659,469 A | 8/1997 | Deaton et al. |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,521 A | 10/1997 | Garrou |
| 5,677,955 A | 10/1997 | Doggett et al. |
| 5,678,046 A | 10/1997 | Cahill et al. |
| 5,680,459 A | 10/1997 | Hook et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,124 A | 11/1997 | Holden et al. |
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,706,452 A | 1/1998 | Ivanov |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,423 A | 3/1998 | Khello |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,742,845 A | 4/1998 | Wagner |
| 5,745,555 A | 4/1998 | Mark |
| 5,761,288 A | 4/1998 | Gray |
| 5,754,840 A | 5/1998 | Rivette |
| 5,758,126 A | 5/1998 | Daniels et al. |
| 5,758,328 A | 5/1998 | Giovannoli |
| 5,761,647 A | 6/1998 | Boushy |
| 5,761,661 A | 6/1998 | Coussenns |
| 5,764,770 A | 6/1998 | Schipper et al. |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holman |
| 5,789,732 A | 8/1998 | McMahon et al. |
| 5,790,650 A | 8/1998 | Dunn |
| 5,790,785 A | 8/1998 | Klug et al. |
| 5,793,302 A | 8/1998 | Mark |
| 5,794,207 A | 8/1998 | Walker |
| 5,794,221 A | 8/1998 | Egendorf |
| 5,794,259 A | 8/1998 | Kikinis |
| 5,796,395 A | 8/1998 | De Hond |
| 5,796,827 A | 8/1998 | Coppersmith et al. |
| 5,797,127 A | 8/1998 | Walker et al. |
| 5,798,508 A | 8/1998 | Walker et al. |
| 5,793,861 A | 9/1998 | Haigh |
| 5,794,178 A | 9/1998 | Caid |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,825,871 A | 10/1998 | Mark |
| 5,825,890 A | 10/1998 | Elgamal et al. |
| 5,826,023 A | 10/1998 | Hall et al. |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,090 A | 11/1998 | Raspotnik |
| 5,832,211 A | 11/1998 | Blakley, III et al. |
| 5,832,457 A | 11/1998 | O'Brien |
| 5,832,460 A | 11/1998 | Bednar |
| 5,832,476 A | 11/1998 | Tada |
| 5,835,087 A | 11/1998 | Herz |

(56) References Cited

U.S. PATENT DOCUMENTS

| | | |
|---|---|---|
| 5,835,580 A | 11/1998 | Fraser |
| 5,835,603 A | 11/1998 | Coutts |
| 5,838,812 A | 11/1998 | Pare et al. |
| 5,838,903 A | 11/1998 | Blakely, III et al. |
| 5,838,906 A | 11/1998 | Doyle |
| 5,841,869 A | 11/1998 | Merkling et al. |
| 5,842,178 A | 11/1998 | Giovannoli |
| 5,842,211 A | 11/1998 | Horadan |
| 5,842,421 A | 12/1998 | Desilets et al. |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,143 A | 12/1998 | Andrews |
| 5,848,190 A | 12/1998 | Kleehammer et al. |
| 5,848,400 A | 12/1998 | Chang |
| 5,848,427 A | 12/1998 | Hyodo |
| 5,852,811 A | 12/1998 | Atkins |
| 5,852,812 A | 12/1998 | Reeder |
| 5,857,079 A | 1/1999 | Claus et al. |
| 5,859,419 A | 1/1999 | Wynn |
| 5,861,906 A | 1/1999 | Dunn et al. |
| 5,862,223 A | 1/1999 | Walker |
| 5,862,323 A | 1/1999 | Blakley, III et al. |
| 5,864,830 A | 1/1999 | Armetta et al. |
| 5,864,871 A | 1/1999 | Kitain et al. |
| RE36,116 E | 2/1999 | McCarthy |
| 5,866,889 A | 2/1999 | Weiss et al. |
| 5,870,456 A | 2/1999 | Rogers |
| 5,870,718 A | 2/1999 | Spector |
| 5,870,721 A | 2/1999 | Norris |
| 5,870,724 A | 2/1999 | Lawlor |
| 5,870,725 A | 2/1999 | Belinger et al. |
| 5,871,398 A | 2/1999 | Schneier et al. |
| 5,873,072 A | 2/1999 | Kight |
| 5,873,096 A | 2/1999 | Lim |
| 5,875,296 A | 2/1999 | Shi et al. |
| 5,878,141 A | 3/1999 | Daly et al. |
| 5,878,405 A | 3/1999 | Grant et al. |
| 5,880,769 A | 3/1999 | Nemirofsky |
| 5,883,810 A | 3/1999 | Franklin et al. |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Chang |
| 5,884,312 A | 3/1999 | Dustan et al. |
| 5,889,863 A | 3/1999 | Weber |
| 5,892,900 A | 4/1999 | Ginter et al. |
| 5,898,780 A | 4/1999 | Liu et al. |
| 5,898,838 A | 4/1999 | Wagner |
| 5,899,982 A | 5/1999 | Randle |
| 5,903,878 A | 5/1999 | Talati et al. |
| 5,903,881 A | 5/1999 | Schrader |
| 5,905,908 A | 5/1999 | Wagner |
| 5,907,142 A | 5/1999 | Kelsey |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,552 A | 7/1999 | Brown et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,952,639 A | 7/1999 | Ohki |
| 5,933,812 A | 8/1999 | Meyer et al. |
| 5,933,817 A | 8/1999 | Hucal |
| 5,933,823 A | 8/1999 | Cullen |
| 5,936,541 A | 8/1999 | Stambler |
| 5,940,811 A | 8/1999 | Norris |
| 5,940,812 A | 8/1999 | Tengel et al. |
| 5,940,843 A | 8/1999 | Zucknovich et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,933,816 A | 9/1999 | Zeanah |
| 5,933,827 A | 9/1999 | Cole |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthun |
| 5,970,143 A | 10/1999 | Schneier et al. |
| 5,970,470 A | 10/1999 | Walker et al. |
| 5,970,478 A | 10/1999 | Walker et al. |
| 5,970,480 A | 10/1999 | Kalina |
| 5,970,482 A | 10/1999 | Pham |
| 5,970,483 A | 10/1999 | Evans |
| 5,974,148 A | 10/1999 | Stambler |
| 5,976,467 A | 11/1999 | Walker et al. |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |
| 5,991,748 A | 11/1999 | Taskett |
| 5,991,751 A | 11/1999 | Rivette et al. |
| 5,991,780 A | 11/1999 | Rivette |
| 5,995,948 A | 11/1999 | Whitford |
| 5,995,976 A | 11/1999 | Walker et al. |
| 6,003,762 A | 11/1999 | Hayashida |
| 5,999,596 A | 12/1999 | Walker et al. |
| 5,999,907 A | 12/1999 | Donner |
| 5,999,971 A | 12/1999 | Buckland |
| 6,000,033 A | 12/1999 | Kelly et al. |
| 6,000,832 A | 12/1999 | Franklin et al. |
| 6,001,016 A | 12/1999 | Walker et al. |
| 6,005,939 A | 12/1999 | Fortenberry et al. |
| 6,005,943 A | 12/1999 | Cohen et al. |
| 6,006,205 A | 12/1999 | Loeb et al. |
| 6,006,249 A | 12/1999 | Leong |
| 6,009,411 A | 12/1999 | Kepecs |
| 6,009,415 A | 12/1999 | Shurling et al. |
| 6,009,442 A | 12/1999 | Chen et al. |
| 6,010,404 A | 1/2000 | Walker et al. |
| 6,012,049 A | 1/2000 | Kawan |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,476 A | 1/2000 | Maes et al. |
| 6,016,810 A | 1/2000 | Ravenscroft |
| 6,018,714 A | 1/2000 | Risen, Jr. |
| 6,018,718 A | 1/2000 | Walker et al. |
| 6,024,640 A | 2/2000 | Walker et al. |
| 6,026,398 A | 2/2000 | Brown et al. |

(56) References Cited

U.S. PATENT DOCUMENTS

| | | |
|---|---|---|
| 6,026,429 A | 2/2000 | Jones et al. |
| 6,029,153 A | 2/2000 | Bauchner et al. |
| 6,029,890 A | 2/2000 | Austin |
| 6,032,134 A | 2/2000 | Weissman |
| 6,032,136 A | 2/2000 | Brake, Jr. et al. |
| 6,032,147 A | 2/2000 | Williams et al. |
| 6,036,099 A | 3/2000 | Leighton |
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,044,402 A | 3/2000 | Jacobson et al. |
| 6,045,039 A | 4/2000 | Stinson et al. |
| 6,047,268 A | 4/2000 | Bartoli et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,660 A | 5/2000 | Eggleston et al. |
| 6,061,665 A | 5/2000 | Bahreman |
| 6,064,987 A | 5/2000 | Walker et al. |
| 6,065,056 A | 5/2000 | Bradshaw et al. |
| 6,065,120 A | 5/2000 | Laursen et al. |
| 6,065,675 A | 5/2000 | Teicher |
| 6,067,531 A | 5/2000 | Hoyt et al. |
| 6,069,968 A | 5/2000 | Shaw et al. |
| 6,070,147 A | 5/2000 | Harms et al. |
| 6,070,153 A | 5/2000 | Simpson |
| 6,070,244 A | 5/2000 | Orchier et al. |
| 6,073,105 A | 6/2000 | Sutcliffe et al. |
| 6,073,113 A | 6/2000 | Guinan |
| 6,075,519 A | 6/2000 | Okatani et al. |
| 6,076,072 A | 6/2000 | Libman |
| 6,081,790 A | 6/2000 | Rosen |
| 6,081,810 A | 6/2000 | Rosenzweig et al. |
| 6,081,900 A | 6/2000 | Subramaniam et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,057 A | 7/2000 | Zimmerman et al. |
| 6,092,192 A | 7/2000 | Kanevsky et al. |
| 6,092,196 A | 7/2000 | Reiche |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,006 A | 8/2000 | Davis et al. |
| 6,105,007 A | 8/2000 | Norris |
| 6,105,012 A | 8/2000 | Chang et al. |
| 6,105,865 A | 8/2000 | Hardesty |
| 6,108,642 A | 8/2000 | Findley |
| 6,111,858 A | 8/2000 | Greaves et al. |
| 6,112,181 A | 8/2000 | Shear et al. |
| 6,115,641 A | 9/2000 | Brown et al. |
| 6,115,642 A | 9/2000 | Brown et al. |
| 6,115,690 A | 9/2000 | Wong |
| 6,119,093 A | 9/2000 | Walker et al. |
| 6,119,099 A | 9/2000 | Walker et al. |
| 6,119,933 A | 9/2000 | Wong et al. |
| 6,128,599 A | 10/2000 | Walker et al. |
| 6,128,602 A | 10/2000 | Northington et al. |
| 6,131,810 A | 10/2000 | Weiss et al. |
| 6,134,549 A | 10/2000 | Regnier et al. |
| 6,134,592 A | 10/2000 | Montulli |
| 6,135,349 A | 10/2000 | Zirkel |
| 6,138,106 A | 10/2000 | Walker et al. |
| 6,138,118 A | 10/2000 | Koppstein et al. |
| 6,138,911 A | 10/2000 | Fredregill et al. |
| 6,141,651 A | 10/2000 | Riley et al. |
| 6,141,666 A | 10/2000 | Tobin |
| 6,144,848 A | 11/2000 | Walsh et al. |
| 6,144,946 A | 11/2000 | Iwamura |
| 6,144,948 A | 11/2000 | Walker et al. |
| 6,145,086 A | 11/2000 | Bellemore et al. |
| 6,148,293 A | 11/2000 | King |
| 6,151,584 A | 11/2000 | Papierniak et al. |
| 6,154,750 A | 11/2000 | Roberge et al. |
| 6,154,879 A | 11/2000 | Pare et al. |
| 6,161,113 A | 12/2000 | Mora et al. |
| 6,161,182 A | 12/2000 | Nadooshan |
| 6,164,533 A | 12/2000 | Barton |
| 6,169,974 B1 | 1/2001 | Baumgartner et al. |
| 6,170,011 B1 | 1/2001 | Beck et al. |
| 6,178,408 B1 | 1/2001 | Copple et al. |
| 6,178,511 B1 | 1/2001 | Cohen et al. |
| 6,182,052 B1 | 1/2001 | Fulton et al. |
| 6,182,059 B1 | 1/2001 | Angotti et al. |
| 6,182,142 B1 | 1/2001 | Win et al. |
| 6,182,220 B1 | 1/2001 | Chen et al. |
| 6,182,225 B1 | 1/2001 | Hagiuda et al. |
| 6,185,242 B1 | 2/2001 | Arthur et al. |
| 6,188,309 B1 | 2/2001 | Levine |
| 6,189,029 B1 | 2/2001 | Fuerst |
| 6,189,787 B1 | 2/2001 | Dorf |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,066 B1 | 3/2001 | Barkley |
| 6,202,151 B1 | 3/2001 | Musgrave et al. |
| 6,202,158 B1 | 3/2001 | Urano et al. |
| 6,208,978 B1 | 3/2001 | Walker et al. |
| 6,208,984 B1 | 3/2001 | Rosenthal |
| 6,213,391 B1 | 4/2001 | Lewis |
| 6,216,115 B1 | 4/2001 | Barrameda et al. |
| 6,219,639 B1 | 4/2001 | Bakis et al. |
| 6,219,706 B1 | 4/2001 | Fan |
| 6,222,914 B1 | 4/2001 | McMullin |
| 6,223,168 B1 | 4/2001 | McGurl et al. |
| 6,226,623 B1 | 5/2001 | Schein et al. |
| 6,226,679 B1 | 5/2001 | Gupta |
| 6,226,752 B1 | 5/2001 | Gupta et al. |
| 6,227,447 B1 | 5/2001 | Campisano |
| 6,230,148 B1 | 5/2001 | Pare et al. |
| 6,243,688 B1 | 6/2001 | Kalina |
| 6,243,689 B1 | 6/2001 | Norton |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,256,664 B1 | 7/2001 | Donoho et al. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,278,996 B1 | 8/2001 | Richardson et al. |
| 6,289,322 B1 | 9/2001 | Kitchen et al. |
| 6,289,324 B1 | 9/2001 | Kawan |
| 6,292,786 B1 | 9/2001 | Deaton et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,315,195 B1 | 11/2001 | Ramachandran |
| 6,317,834 B1 | 11/2001 | Gennaro et al. |
| 6,317,838 B1 | 11/2001 | Baize |
| 6,321,224 B1 | 11/2001 | Beall et al. |
| 6,321,337 B1 | 11/2001 | Reshef et al. |
| 6,324,524 B1 | 11/2001 | Lent et al. |
| 6,327,573 B1 | 12/2001 | Walker et al. |
| 6,327,575 B1 | 12/2001 | Katz |
| 6,327,578 B1 | 12/2001 | Linehan |
| 6,330,543 B1 | 12/2001 | Kepecs |
| 6,332,126 B1 | 12/2001 | Peirce et al. |
| 6,332,192 B1 | 12/2001 | Boroditsky et al. |
| 6,334,108 B1 | 12/2001 | Deaton et al. |

(56) References Cited

U.S. PATENT DOCUMENTS

| | | |
|---|---|---|
| 6,336,104 B1 | 1/2002 | Walker et al. |
| 6,339,423 B1 | 1/2002 | Sampson et al. |
| 6,341,724 B2 | 1/2002 | Campisano |
| 6,343,279 B1 | 1/2002 | Bissonette et al. |
| 6,343,323 B1 | 1/2002 | Kalpio et al. |
| 6,345,261 B1 | 2/2002 | Feidelson |
| 6,349,242 B2 | 2/2002 | Mahaffey |
| 6,349,290 B1 | 2/2002 | Horowitz et al. |
| 6,349,336 B1 | 2/2002 | Sit et al. |
| 6,360,209 B1 | 3/2002 | Loeb et al. |
| 6,363,381 B1 | 3/2002 | Lee et al. |
| 6,366,682 B1 | 4/2002 | Hoffman et al. |
| 6,381,587 B1 | 4/2002 | Guzelsu |
| 6,385,591 B1 | 5/2002 | Mankoff |
| 6,385,652 B1 | 5/2002 | Brown et al. |
| 6,401,125 B1 | 6/2002 | Makarios et al. |
| 6,401,206 B1 | 6/2002 | Khan et al. |
| 6,401,211 B1 | 6/2002 | Brezak, Jr. et al. |
| 6,404,866 B1 | 6/2002 | Hopper et al. |
| 6,405,175 B1 | 6/2002 | Ng |
| 6,405,181 B2 | 6/2002 | Lent et al. |
| 6,408,389 B2 | 6/2002 | Grawrock |
| 6,409,080 B2 | 6/2002 | Kawagishi |
| 6,411,933 B1 | 6/2002 | Maes et al. |
| 6,411,947 B1 | 6/2002 | Rice et al. |
| 6,418,457 B1 | 7/2002 | Schmidt et al. |
| 6,424,947 B1 | 7/2002 | Tsuria et al. |
| 6,424,949 B1 | 7/2002 | Deaton et al. |
| 6,424,951 B1 | 7/2002 | Shurling et al. |
| 6,434,534 B1 | 8/2002 | Walker et al. |
| 6,438,594 B1 | 8/2002 | Bowman-Amuah |
| 6,438,666 B2 | 8/2002 | Cassagnol et al. |
| 6,442,607 B1 | 8/2002 | Korn et al. |
| 6,446,053 B1 | 9/2002 | Elliott |
| 6,446,111 B1 | 9/2002 | Lowery |
| 6,449,765 B1 | 9/2002 | Ballard |
| 6,453,353 B1 | 9/2002 | Win et al. |
| 6,460,141 B1 | 10/2002 | Olden |
| 6,470,357 B1 | 10/2002 | Garcia, Jr. et al. |
| 6,484,149 B1 | 11/2002 | Jammes |
| 6,487,641 B1 | 11/2002 | Cusson et al. |
| 6,490,601 B1 | 12/2002 | Markus et al. |
| 6,490,680 B1 | 12/2002 | Scheidt et al. |
| 6,493,677 B1 | 12/2002 | von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,498,657 B1 | 12/2002 | Kuntz et al. |
| 6,507,912 B1 | 1/2003 | Matyas, Jr. et al. |
| 6,510,523 B1 | 1/2003 | Perlman et al. |
| 6,513,019 B2 | 1/2003 | Lewis |
| 6,516,302 B1 | 2/2003 | Deaton et al. |
| 6,519,763 B1 | 2/2003 | Kaufer et al. |
| 6,526,404 B1 | 2/2003 | Slater et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,027 B1 | 3/2003 | Cambron |
| 6,539,424 B1 | 3/2003 | Dutta |
| 6,546,392 B1 | 4/2003 | Bahlmann |
| 6,549,972 B1 | 4/2003 | Berstis et al. |
| 6,557,039 B1 | 4/2003 | Leong et al. |
| 6,560,581 B1 | 5/2003 | Fox et al. |
| 6,564,189 B1 | 5/2003 | Nycz |
| 6,567,791 B2 | 5/2003 | Lent et al. |
| 6,571,216 B1 | 5/2003 | Garg et al. |
| 6,574,348 B1 | 6/2003 | Venkatesan et al. |
| 6,578,012 B1 | 6/2003 | Storey |
| 6,580,814 B1 | 6/2003 | Ittycheriah et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,587,835 B1 | 7/2003 | Treyz et al. |
| 6,589,291 B1 | 7/2003 | Boag et al. |
| 6,592,044 B1 | 7/2003 | Wong et al. |
| 6,594,640 B1 | 7/2003 | Postrel |
| 6,607,127 B2 | 8/2003 | Wong |
| 6,609,104 B1 | 8/2003 | Deaton et al. |
| 6,609,106 B1 | 8/2003 | Robertson |
| 6,609,113 B1 | 8/2003 | O'Leary et al. |
| 6,609,125 B1 | 8/2003 | Layne et al. |
| 6,609,198 B1 | 8/2003 | Wood et al. |
| 6,609,654 B1 | 8/2003 | Anderson et al. |
| 6,611,811 B1 | 8/2003 | Deaton et al. |
| 6,611,819 B1 | 8/2003 | Oneda |
| 6,618,579 B1 | 9/2003 | Smith et al. |
| 6,618,806 B1 | 9/2003 | Brown et al. |
| 6,623,415 B2 | 9/2003 | Gates et al. |
| 6,624,761 B2 | 9/2003 | Fallon |
| 6,631,849 B2 | 10/2003 | Blossom |
| 6,640,302 B1 | 10/2003 | Subramaniam et al. |
| 6,641,050 B2 | 11/2003 | Kelley et al. |
| 6,647,376 B1 | 11/2003 | Farrar et al. |
| 6,651,168 B1 | 11/2003 | Kao et al. |
| 6,662,215 B1 | 12/2003 | Moskowitz et al. |
| 6,668,321 B2 | 12/2003 | Nendell et al. |
| 6,668,322 B1 | 12/2003 | Wood et al. |
| 6,671,683 B2 * | 12/2003 | Kanno ............... G06F 17/3061 |
| 6,671,818 B1 | 12/2003 | Mikurak |
| 6,675,261 B2 | 1/2004 | Shandony |
| 6,684,195 B1 | 1/2004 | Deaton et al. |
| 6,684,212 B1 | 1/2004 | Day et al. |
| 6,684,248 B1 | 1/2004 | Janacek et al. |
| 6,684,384 B1 | 1/2004 | Bickerton et al. |
| 6,687,222 B1 | 2/2004 | Albert et al. |
| 6,687,245 B2 | 2/2004 | Fangman et al. |
| 6,697,947 B1 | 2/2004 | Matyas, Jr. et al. |
| 6,714,919 B1 | 3/2004 | Findley |
| 6,714,987 B1 | 3/2004 | Amin et al. |
| 6,718,313 B1 | 4/2004 | Lent et al. |
| 6,718,388 B1 | 4/2004 | Yarborough et al. |
| 6,718,482 B2 | 4/2004 | Sato et al. |
| 6,718,535 B1 | 4/2004 | Underwood |
| 6,721,743 B1 | 4/2004 | Sakakibara |
| 6,725,269 B1 | 4/2004 | Megiddo |
| 6,727,802 B2 | 4/2004 | Kelly et al. |
| 6,732,087 B1 | 5/2004 | Hughes et al. |
| 6,735,695 B1 | 5/2004 | Gopalakrishnan et al. |
| 6,735,778 B2 | 5/2004 | Khoo et al. |
| 6,738,779 B1 | 5/2004 | Shapira |
| D490,840 S | 6/2004 | Arakaki et al. |
| D491,186 S | 6/2004 | Arakaki et al. |
| D491,953 S | 6/2004 | Arakaki et al. |
| 6,751,654 B2 | 6/2004 | Massarani et al. |
| 6,754,640 B2 | 6/2004 | Bozeman |
| 6,754,833 B1 | 6/2004 | Black et al. |
| 6,755,341 B1 | 6/2004 | Wong et al. |
| 6,766,370 B2 | 7/2004 | Glommen et al. |
| 6,769,605 B1 | 8/2004 | Magness |
| 6,772,146 B2 | 8/2004 | Khemlani et al. |
| 6,775,783 B1 | 8/2004 | Trostle |
| 6,785,810 B1 | 8/2004 | Lirov et al. |
| D496,365 S | 9/2004 | Liu et al. |
| 6,789,115 B1 | 9/2004 | Singer et al. |
| 6,792,572 B1 | 9/2004 | Frohlick |
| 6,795,809 B2 | 9/2004 | O'Brien et al. |
| 6,795,812 B1 | 9/2004 | Lent et al. |
| 6,795,835 B2 | 9/2004 | Ricart et al. |
| 6,804,786 B1 | 10/2004 | Chamley et al. |
| 6,805,288 B2 | 10/2004 | Routhenstein et al. |
| 6,807,285 B1 | 10/2004 | Iwamura |
| 6,810,395 B1 | 10/2004 | Bharat |
| D498,236 S | 11/2004 | Liu et al. |
| 6,817,008 B2 | 11/2004 | Leford et al. |
| 6,819,219 B1 | 11/2004 | Bolle et al. |
| 6,819,748 B2 | 11/2004 | Matada |
| 6,820,061 B2 | 11/2004 | Postrel |
| 6,820,202 B1 | 11/2004 | Wheeler et al. |
| 6,826,696 B1 | 11/2004 | Chawla et al. |
| 6,829,586 B2 | 12/2004 | Postrel |
| 6,832,202 B1 | 12/2004 | Schuyler et al. |
| 6,832,587 B2 | 12/2004 | Wampula et al. |
| 6,842,739 B2 | 1/2005 | Postrel |

(56) References Cited

U.S. PATENT DOCUMENTS

| | | |
|---|---|---|
| 6,847,991 B1 | 1/2005 | Kurapati |
| 6,856,970 B1 | 2/2005 | Campbell et al. |
| RE38,717 E | 3/2005 | Bothwell |
| 6,865,547 B1 | 3/2005 | Brake, Jr. et al. |
| 6,868,391 B1 | 3/2005 | Hultgren |
| 6,874,139 B2 | 3/2005 | Krueger et al. |
| 6,889,198 B2 | 5/2005 | Kawan |
| 6,892,231 B2 | 5/2005 | Jager |
| 6,901,375 B2 | 5/2005 | Fernandez |
| 6,901,406 B2 | 5/2005 | Nabe et al. |
| 6,907,566 B1 | 6/2005 | McElfresh et al. |
| 6,915,271 B1 | 7/2005 | Meyer et al. |
| 6,920,611 B1 | 7/2005 | Spaeth et al. |
| 6,925,481 B2 | 8/2005 | Singhal et al. |
| 6,931,382 B2 | 8/2005 | Laage et al. |
| 6,934,848 B1 | 8/2005 | King et al. |
| 6,937,976 B2 | 8/2005 | Apte |
| 6,938,020 B2 | 8/2005 | Nakayama |
| 6,938,156 B2 | 8/2005 | Wheeler et al. |
| 6,938,158 B2 | 8/2005 | Azuma |
| RE38,801 E | 9/2005 | Rogers |
| 6,947,897 B2 | 9/2005 | Lortscher et al. |
| 6,947,898 B2 | 9/2005 | Postrel |
| 6,950,826 B1 | 9/2005 | Freeman |
| 6,950,881 B1 | 9/2005 | Ndili |
| 6,950,936 B2 | 9/2005 | Subramaniam et al. |
| 6,950,940 B2 | 9/2005 | Wheeler et al. |
| 6,954,932 B2 | 10/2005 | Nakamura et al. |
| 6,957,337 B1 | 10/2005 | Chainer et al. |
| 6,963,857 B1 | 11/2005 | Johnson |
| 6,965,939 B2 | 11/2005 | Cuomo et al. |
| 6,970,830 B1 | 11/2005 | Samra et al. |
| 6,976,067 B2 | 12/2005 | Gusler et al. |
| 6,976,164 B1 | 12/2005 | King et al. |
| 6,978,275 B2 * | 12/2005 | Castellanos ....... G06F 17/30719 |
| 6,978,378 B1 | 12/2005 | Koretz |
| 6,980,962 B1 | 12/2005 | Arganbright et al. |
| 6,983,421 B1 | 1/2006 | Lahti et al. |
| 6,985,879 B2 | 1/2006 | Walker et al. |
| 6,992,786 B1 | 1/2006 | Breding et al. |
| 6,999,938 B1 | 2/2006 | Libman |
| 7,003,476 B1 | 2/2006 | Samra et al. |
| 7,003,565 B2 | 2/2006 | Hind et al. |
| 7,006,979 B1 | 2/2006 | Samra et al. |
| 7,006,983 B1 | 2/2006 | Packes et al. |
| 7,010,495 B1 | 3/2006 | Samra et al. |
| 7,010,512 B1 | 3/2006 | Gillin et al. |
| 7,020,696 B1 | 3/2006 | Perry et al. |
| 7,024,374 B1 | 4/2006 | Day et al. |
| 7,032,110 B1 | 4/2006 | Su et al. |
| 7,039,714 B1 | 5/2006 | Blakley, III et al. |
| 7,043,455 B1 | 5/2006 | Cuomo et al. |
| 7,047,222 B1 | 5/2006 | Bush |
| 7,051,199 B1 | 5/2006 | Berson et al. |
| 7,051,330 B1 | 5/2006 | Kaler et al. |
| 7,051,929 B2 | 5/2006 | Li |
| 7,058,817 B1 | 6/2006 | Ellmore |
| 7,069,434 B1 | 6/2006 | Ilnicki et al. |
| 7,076,453 B2 | 7/2006 | Jammes et al. |
| 7,080,036 B1 | 7/2006 | Drummond et al. |
| 7,089,203 B1 | 8/2006 | Crookshanks |
| 7,089,208 B1 | 8/2006 | Levchin et al. |
| 7,089,503 B1 | 8/2006 | Bloomguist et al. |
| 7,089,585 B1 | 8/2006 | Dharmarajan |
| 7,092,992 B1 | 8/2006 | Yu |
| 7,093,020 B1 | 8/2006 | McCarty et al. |
| 7,093,282 B2 | 8/2006 | Hillhouse |
| 7,103,556 B2 | 9/2006 | Del Rey et al. |
| 7,110,962 B2 | 9/2006 | Amon et al. |
| 7,111,173 B1 | 9/2006 | Scheidt |
| 7,117,239 B1 | 10/2006 | Hansen |
| 7,124,101 B1 | 10/2006 | Mikurak |
| 7,134,075 B2 | 11/2006 | Hind |
| 7,137,006 B1 | 11/2006 | Grandcolas et al. |
| 7,139,686 B1 | 11/2006 | Critz |
| 7,143,174 B2 | 11/2006 | Miller et al. |
| 7,152,242 B2 | 12/2006 | Douglas |
| 7,155,402 B1 | 12/2006 | Dvorak |
| 7,155,614 B2 | 12/2006 | Ellmore |
| 7,161,506 B2 | 1/2007 | Fallon |
| 7,163,153 B2 | 1/2007 | Blossom |
| 7,177,830 B2 | 2/2007 | Shields et al. |
| 7,185,094 B2 | 2/2007 | Marquette et al. |
| 7,188,181 B1 | 3/2007 | Squier et al. |
| 7,191,952 B2 | 3/2007 | Blossom |
| 7,195,154 B2 | 3/2007 | Routhenstein |
| 7,197,470 B1 | 3/2007 | Arnett |
| 7,203,909 B1 | 4/2007 | Horvitz et al. |
| 7,225,249 B1 | 5/2007 | Barry |
| 7,225,462 B2 | 5/2007 | Bass et al. |
| 7,225,464 B2 | 5/2007 | Satyavolu et al. |
| 7,228,155 B2 | 6/2007 | Saunders |
| 7,249,112 B2 | 7/2007 | Berardi et al. |
| 7,266,835 B2 | 9/2007 | Halbert |
| 7,272,857 B1 * | 9/2007 | Everhart ............ H04N 21/4627 348/E7.069 |
| 7,299,201 B2 | 11/2007 | Jammes |
| 7,302,585 B1 | 11/2007 | Proudler et al. |
| 7,312,707 B1 | 12/2007 | Bishop et al. |
| 7,313,802 B1 | 12/2007 | Tomsen |
| 7,321,864 B1 | 1/2008 | Gendler |
| 7,340,773 B2 | 3/2008 | Edwards |
| 7,349,866 B2 | 3/2008 | Schwarz, Jr. |
| 7,353,383 B2 | 4/2008 | Skingle |
| 7,357,331 B2 | 4/2008 | Blossom |
| 7,370,011 B2 | 5/2008 | Bennett |
| 7,395,241 B1 | 7/2008 | Cook et al. |
| 7,400,274 B2 | 7/2008 | Fallon et al. |
| 7,417,568 B2 | 8/2008 | Fallon et al. |
| 7,426,530 B1 | 9/2008 | Rosko et al. |
| 7,440,923 B1 | 10/2008 | Compiano |
| 7,444,672 B2 | 10/2008 | Ellmore |
| 7,461,265 B2 | 12/2008 | Ellmore |
| 7,467,096 B2 | 12/2008 | Antonucci et al. |
| 7,472,171 B2 | 12/2008 | Miller et al. |
| 7,480,631 B1 | 1/2009 | Merced et al. |
| 7,485,040 B2 | 2/2009 | Walker et al. |
| 7,490,064 B2 | 2/2009 | Allin et al. |
| 7,493,288 B2 | 2/2009 | Biship et al. |
| 7,493,636 B2 | 2/2009 | Kitsukawa et al. |
| 7,496,950 B2 | 2/2009 | Carley |
| 7,506,806 B2 | 3/2009 | Bonalle et al. |
| 7,539,635 B1 | 5/2009 | Peak et al. |
| 7,545,931 B2 | 6/2009 | Dillaway |
| 7,549,170 B2 | 6/2009 | Stubblefield et al. |
| 7,581,112 B2 | 8/2009 | Brown et al. |
| 7,599,856 B2 | 10/2009 | Agrawal et al. |
| 7,617,532 B1 * | 11/2009 | Alexander ............ G06F 21/554 713/154 |
| 7,640,321 B2 | 12/2009 | Yabe et al. |
| 7,689,504 B2 | 3/2010 | Warren et al. |
| 7,689,506 B2 | 3/2010 | Fei et al. |
| 7,707,089 B1 | 4/2010 | Barton et al. |
| 7,747,866 B1 | 6/2010 | Everhart |
| 7,770,220 B2 * | 8/2010 | Fernstrom ........... G06F 21/6227 726/18 |
| 7,861,096 B2 * | 12/2010 | Staddon ............. G06F 21/6209 380/277 |
| 7,926,102 B2 * | 4/2011 | Broussard ........... G06F 21/6245 726/18 |
| 7,937,579 B2 * | 5/2011 | Peckover ................ G06F 21/10 707/783 |
| 7,979,413 B2 | 7/2011 | Krishnamurthy et al. |
| 8,046,374 B1 * | 10/2011 | Bromwich ........... G06F 21/552 707/759 |
| 8,150,716 B1 * | 4/2012 | Lunsford ............. G06Q 10/063 705/7.11 |
| 8,176,563 B2 * | 5/2012 | Redlich ............... G06F 21/6209 713/166 |
| 8,181,261 B2 * | 5/2012 | Sperry ................ G06F 21/6245 380/243 |
| 8,332,907 B2 * | 12/2012 | Canning ............. G06F 21/6218 709/224 |

(56) References Cited

U.S. PATENT DOCUMENTS

| | | | |
|---|---|---|---|
| 8,561,185 B1 * | 10/2013 | Muthusrinivasan | G06F 21/6245 705/51 |
| 8,849,716 B1 * | 9/2014 | Everhart | G06F 21/6245 705/1.1 |
| 9,015,301 B2 * | 4/2015 | Redlich | G06Q 10/10 707/609 |
| 2001/0002487 A1 | 5/2001 | Grawrock et al. | |
| 2001/0011250 A1 | 8/2001 | Paltenghe et al. | |
| 2001/0011255 A1 | 8/2001 | Asay et al. | |
| 2001/0012974 A1 | 8/2001 | Mahaffey | |
| 2001/0016835 A1 | 8/2001 | Hansmann et al. | |
| 2001/0023407 A1 | 9/2001 | Liyanearachchi et al. | |
| 2001/0025253 A1 | 9/2001 | Heintz et al. | |
| 2001/0027441 A1 | 10/2001 | Wankmueller | |
| 2001/0027474 A1 | 10/2001 | Nachman et al. | |
| 2001/0029464 A1 | 10/2001 | Schweitzwer | |
| 2001/0029490 A1 | 10/2001 | Inamochi | |
| 2001/0032183 A1 | 10/2001 | Landry | |
| 2001/0032184 A1 | 10/2001 | Tenembaum | |
| 2001/0032312 A1 | 10/2001 | Runje et al. | |
| 2001/0034651 A1 | 10/2001 | Marks et al. | |
| 2001/0034663 A1 | 10/2001 | Teveler et al. | |
| 2001/0034718 A1 | 10/2001 | Shaked et al. | |
| 2001/0034720 A1 | 10/2001 | Armes | |
| 2001/0037243 A1 | 11/2001 | Rouston et al. | |
| 2001/0037299 A1 | 11/2001 | Nichols et al. | |
| 2001/0037324 A1 | 11/2001 | Agrawal et al. | |
| 2001/0038033 A1 | 11/2001 | Habib | |
| 2001/0039511 A1 | 11/2001 | Duckworth et al. | |
| 2001/0044764 A1 | 11/2001 | Arnold | |
| 2001/0047295 A1 | 11/2001 | Tenembaum | |
| 2001/0047342 A1 | 11/2001 | Cuervo | |
| 2001/0049628 A1 | 12/2001 | Icho | |
| 2001/0051917 A1 | 12/2001 | Bissonette et al. | |
| 2001/0054003 A1 | 12/2001 | Chien et al. | |
| 2001/0054059 A1 | 12/2001 | Marks et al. | |
| 2002/0002479 A1 | 1/2002 | Almog et al. | |
| 2002/0002485 A1 | 1/2002 | O'Brien et al. | |
| 2002/0002495 A1 | 1/2002 | Ullman | |
| 2002/0004742 A1 | 1/2002 | Willcocks et al. | |
| 2002/0007313 A1 | 1/2002 | Mai et al. | |
| 2002/0007460 A1 | 1/2002 | Azuma | |
| 2002/0010599 A1 | 1/2002 | Levison | |
| 2002/0010621 A1 | 1/2002 | Bell et al. | |
| 2002/0010627 A1 | 1/2002 | Lerat | |
| 2002/0010668 A1 | 1/2002 | Travis et al. | |
| 2002/0011517 A1 | 1/2002 | Namekawa et al. | |
| 2002/0018585 A1 | 2/2002 | Kim | |
| 2002/0019938 A1 | 2/2002 | Aarons | |
| 2002/0023108 A1 | 2/2002 | Daswani et al. | |
| 2002/0026365 A1 | 2/2002 | Natanzon | |
| 2002/0029269 A1 | 3/2002 | McCarty et al. | |
| 2002/0031230 A1 | 3/2002 | Sweet et al. | |
| 2002/0032613 A1 | 3/2002 | Buettgenbach et al. | |
| 2002/0032622 A1 | 3/2002 | Petit et al. | |
| 2002/0032650 A1 | 3/2002 | Hauser et al. | |
| 2002/0040311 A1 * | 4/2002 | Douglass | G06Q 30/02 705/26.64 |
| 2002/0040344 A1 | 4/2002 | Preiser et al. | |
| 2002/0042742 A1 | 4/2002 | Glover et al. | |
| 2002/0042774 A1 | 4/2002 | Ortiz et al. | |
| 2002/0042808 A1 | 4/2002 | Smith et al. | |
| 2002/0046110 A1 | 4/2002 | Gallagher | |
| 2002/0046116 A1 | 4/2002 | Hohle et al. | |
| 2002/0049605 A1 | 4/2002 | Hagi | |
| 2002/0052778 A1 | 5/2002 | Murphy et al. | |
| 2002/0052852 A1 | 5/2002 | Bozeman | |
| 2002/0055874 A1 | 5/2002 | Williams | |
| 2002/0059103 A1 | 5/2002 | Anderson et al. | |
| 2002/0059141 A1 | 5/2002 | Davies et al. | |
| 2002/0062253 A1 | 5/2002 | Dosh et al. | |
| 2002/0062257 A1 | 5/2002 | Minamishin et al. | |
| 2002/0065735 A1 | 5/2002 | Hatakama et al. | |
| 2002/0069104 A1 | 6/2002 | Beach et al. | |
| 2002/0069109 A1 | 6/2002 | Wendkos | |
| 2002/0069158 A1 | 6/2002 | Larkin et al. | |
| 2002/0069172 A1 | 6/2002 | Omshehe et al. | |
| 2002/0070270 A1 | 6/2002 | Narita et al. | |
| 2002/0072931 A1 | 6/2002 | Card | |
| 2002/0072974 A1 | 6/2002 | Pugliese et al. | |
| 2002/0073019 A1 | 6/2002 | Deaton | |
| 2002/0073313 A1 | 6/2002 | Brown et al. | |
| 2002/0077890 A1 | 6/2002 | Lapointe et al. | |
| 2002/0077895 A1 | 6/2002 | Howell | |
| 2002/0077904 A1 | 6/2002 | Ali | |
| 2002/0077964 A1 | 6/2002 | Brody et al. | |
| 2002/0077966 A1 | 6/2002 | Harycki et al. | |
| 2002/0077978 A1 | 6/2002 | O'Leary et al. | |
| 2002/0082920 A1 | 6/2002 | Austin et al. | |
| 2002/0082962 A1 | 6/2002 | Farris et al. | |
| 2002/0087349 A1 | 7/2002 | Wong | |
| 2002/0087447 A1 | 7/2002 | McDonald et al. | |
| 2002/0087471 A1 | 7/2002 | Ganesan et al. | |
| 2002/0091567 A1 | 7/2002 | Royston | |
| 2002/0095443 A1 | 7/2002 | Kovack | |
| 2002/0099601 A1 | 7/2002 | Farrell | |
| 2002/0099649 A1 | 7/2002 | Lee et al. | |
| 2002/0099826 A1 | 7/2002 | Summers et al. | |
| 2002/0099936 A1 | 7/2002 | Kou et al. | |
| 2002/0104006 A1 | 8/2002 | Boate et al. | |
| 2002/0104017 A1 | 8/2002 | Stefan | |
| 2002/0107731 A1 | 8/2002 | Teng | |
| 2002/0107788 A1 | 8/2002 | Cunningham | |
| 2002/0111859 A1 | 8/2002 | Sheldon et al. | |
| 2002/0111860 A1 | 8/2002 | Jones | |
| 2002/0111861 A1 | 8/2002 | Sakamoto et al. | |
| 2002/0111890 A1 | 8/2002 | Sloan et al. | |
| 2002/0111891 A1 | 8/2002 | Hoffman et al. | |
| 2002/0116266 A1 | 8/2002 | Marshall | |
| 2002/0116331 A1 | 8/2002 | Cataline et al. | |
| 2002/0120497 A1 | 8/2002 | King | |
| 2002/0120571 A1 | 8/2002 | Maung et al. | |
| 2002/0120846 A1 | 8/2002 | Stewart et al. | |
| 2002/0123926 A1 | 9/2002 | Bushold et al. | |
| 2002/0123946 A1 | 9/2002 | Haworth et al. | |
| 2002/0123955 A1 | 9/2002 | Andreski et al. | |
| 2002/0128903 A1 | 9/2002 | Kernahan | |
| 2002/0128916 A1 | 9/2002 | Beinecke | |
| 2002/0128977 A1 | 9/2002 | Nambiar et al. | |
| 2002/0129140 A1 | 9/2002 | Peled et al. | |
| 2002/0133401 A1 | 9/2002 | Mount et al. | |
| 2002/0143614 A1 | 10/2002 | MacLean et al. | |
| 2002/0143621 A1 | 10/2002 | Donnelly et al. | |
| 2002/0143626 A1 | 10/2002 | Voltmer et al. | |
| 2002/0143874 A1 | 10/2002 | Marquette et al. | |
| 2002/0147633 A1 | 10/2002 | Rafizadeh | |
| 2002/0147691 A1 | 10/2002 | Davis et al. | |
| 2002/0152116 A1 | 10/2002 | Yan et al. | |
| 2002/0152118 A1 | 10/2002 | Hadjigeorgis | |
| 2002/0152123 A1 | 10/2002 | Giordano et al. | |
| 2002/0152163 A1 | 10/2002 | Bezos et al. | |
| 2002/0152179 A1 | 10/2002 | Racov | |
| 2002/0156900 A1 | 10/2002 | Marquette et al. | |
| 2002/0161630 A1 | 10/2002 | Kern et al. | |
| 2002/0161641 A1 | 10/2002 | Quinlan et al. | |
| 2002/0165808 A1 | 11/2002 | Zamsky et al. | |
| 2002/0165949 A1 | 11/2002 | Na | |
| 2002/0169671 A1 | 11/2002 | Junger | |
| 2002/0174010 A1 | 11/2002 | Rice, III | |
| 2002/0174011 A1 | 11/2002 | Sanchez et al. | |
| 2002/0178056 A1 | 11/2002 | Lim | |
| 2002/0178112 A1 | 11/2002 | Goeller et al. | |
| 2002/0178113 A1 | 11/2002 | Clifford et al. | |
| 2002/0178213 A1 | 11/2002 | Parry | |
| 2002/0184507 A1 | 12/2002 | Makower et al. | |
| 2002/0188478 A1 | 12/2002 | Breeland et al. | |
| 2002/0188509 A1 | 12/2002 | Ariff et al. | |
| 2002/0188511 A1 | 12/2002 | Johnson et al. | |
| 2002/0188565 A1 | 12/2002 | Nakamura et al. | |
| 2002/0188869 A1 | 12/2002 | Patrick | |
| 2002/0191548 A1 | 12/2002 | Ylonen et al. | |
| 2002/0194071 A1 | 12/2002 | Yoshizaki et al. | |

(56) References Cited

U.S. PATENT DOCUMENTS

| | | |
|---|---|---|
| 2002/0194119 A1 | 12/2002 | Wright et al. |
| 2002/0194166 A1* | 12/2002 | Fowler .............. G06F 17/30646 |
| 2002/0198803 A1 | 12/2002 | Rowe |
| 2002/0198806 A1 | 12/2002 | Blagg et al. |
| 2002/0198807 A1 | 12/2002 | Kobayashi et al. |
| 2003/0001888 A1 | 1/2003 | Power |
| 2003/0004794 A1 | 1/2003 | Hamilton |
| 2003/0004803 A1 | 1/2003 | Glover et al. |
| 2003/0004809 A1 | 1/2003 | Palcic et al. |
| 2003/0005288 A1 | 1/2003 | Moskowitz et al. |
| 2003/0009374 A1 | 1/2003 | Moodie et al. |
| 2003/0009379 A1 | 1/2003 | Narasimhan et al. |
| 2003/0009393 A1 | 1/2003 | Norris |
| 2003/0009426 A1 | 1/2003 | Ruiz-Sanchez |
| 2003/0018523 A1 | 1/2003 | Rappaport et al. |
| 2003/0018549 A1 | 1/2003 | Fei et al. |
| 2003/0018915 A1 | 1/2003 | Stoll |
| 2003/0023557 A1 | 1/2003 | Moore |
| 2003/0023880 A1 | 1/2003 | Edward et al. |
| 2003/0033252 A1 | 2/2003 | Buttridge et al. |
| 2003/0034388 A1 | 2/2003 | Routhenstein et al. |
| 2003/0036952 A1 | 2/2003 | Panttaja et al. |
| 2003/0037131 A1 | 2/2003 | Verma |
| 2003/0037142 A1 | 2/2003 | Munger et al. |
| 2003/0040964 A1 | 2/2003 | Lacek |
| 2003/0040995 A1 | 2/2003 | Daddario et al. |
| 2003/0041165 A1 | 2/2003 | Spencer et al. |
| 2003/0046173 A1 | 3/2003 | Benjier et al. |
| 2003/0046587 A1 | 3/2003 | Bheemarasetti et al. |
| 2003/0046589 A1 | 3/2003 | Gregg |
| 2003/0048888 A1 | 3/2003 | Hopper et al. |
| 2003/0050831 A1 | 3/2003 | Klayh |
| 2003/0051026 A1 | 3/2003 | Carter et al. |
| 2003/0055783 A1 | 3/2003 | Cataline et al. |
| 2003/0055871 A1 | 3/2003 | Roses |
| 2003/0061093 A1 | 3/2003 | Todd |
| 2003/0061097 A1 | 3/2003 | Walker et al. |
| 2003/0061098 A1 | 3/2003 | Meyer |
| 2003/0061168 A1 | 3/2003 | Routhenstein |
| 2003/0065618 A1 | 4/2003 | Vandeboe, Jr. |
| 2003/0069808 A1 | 4/2003 | Cardno |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0083933 A1 | 5/2003 | McAlear |
| 2003/0083939 A1 | 5/2003 | Wohl |
| 2003/0084002 A1 | 5/2003 | Ericson et al. |
| 2003/0084345 A1 | 5/2003 | Bjornestad et al. |
| 2003/0084647 A1 | 5/2003 | Smith et al. |
| 2003/0085286 A1 | 5/2003 | Kelley et al. |
| 2003/0088462 A1 | 5/2003 | Carrither et al. |
| 2003/0088470 A1 | 5/2003 | Cuervo |
| 2003/0088489 A1 | 5/2003 | Peters et al. |
| 2003/0088552 A1 | 5/2003 | Bennett et al. |
| 2003/0097298 A1 | 5/2003 | Klimpl et al. |
| 2003/0097574 A1 | 5/2003 | Upton |
| 2003/0101131 A1 | 5/2003 | Warren et al. |
| 2003/0101454 A1 | 5/2003 | Ozer et al. |
| 2003/0105688 A1 | 6/2003 | Brown et al. |
| 2003/0105689 A1 | 6/2003 | Chandak et al. |
| 2003/0105981 A1 | 6/2003 | Miller et al. |
| 2003/0110399 A1 | 6/2003 | Rail |
| 2003/0115100 A1 | 6/2003 | Teicher |
| 2003/0115160 A1 | 6/2003 | Nowlin et al. |
| 2003/0119642 A1 | 6/2003 | Gates et al. |
| 2003/0120544 A1 | 6/2003 | Gritzbach et al. |
| 2003/0120949 A1* | 6/2003 | Redlich ............ C07K 14/70575 726/21 |
| 2003/0125969 A1 | 7/2003 | Kizer et al. |
| 2003/0126011 A1 | 7/2003 | Bryman et al. |
| 2003/0130895 A1 | 7/2003 | Antonucci et al. |
| 2003/0131357 A1 | 7/2003 | Kim |
| 2003/0144902 A1 | 7/2003 | Bowie |
| 2003/0149594 A1 | 8/2003 | Beazley et al. |
| 2003/0149629 A1 | 8/2003 | Claridge et al. |
| 2003/0149756 A1 | 8/2003 | Grieve et al. |
| 2003/0154171 A1 | 8/2003 | Karp et al. |
| 2003/0154403 A1 | 8/2003 | Keinsley et al. |
| 2003/0158776 A1 | 8/2003 | Landesmann |
| 2003/0158782 A1 | 8/2003 | Thomson et al. |
| 2003/0158818 A1 | 8/2003 | George et al. |
| 2003/0159072 A1 | 8/2003 | Bellinger et al. |
| 2003/0163700 A1 | 8/2003 | Paatero |
| 2003/0163733 A1 | 8/2003 | Barriga-Caceres et al. |
| 2003/0167229 A1 | 9/2003 | Ludwig et al. |
| 2003/0171992 A1 | 9/2003 | Blagg et al. |
| 2003/0177067 A1 | 9/2003 | Cowell et al. |
| 2003/0182246 A1 | 9/2003 | Johnson et al. |
| 2003/0187787 A1 | 10/2003 | Freund |
| 2003/0191549 A1 | 10/2003 | Otsuka et al. |
| 2003/0195805 A1 | 10/2003 | Storey |
| 2003/0200141 A1 | 10/2003 | Robison |
| 2003/0200142 A1 | 10/2003 | Hicks et al. |
| 2003/0204460 A1 | 10/2003 | Robinson et al. |
| 2003/0205617 A1 | 11/2003 | Allen et al. |
| 2003/0208400 A1 | 11/2003 | Kuo et al. |
| 2003/0208439 A1 | 11/2003 | Rast |
| 2003/0212630 A1 | 11/2003 | Kahr |
| 2003/0212887 A1 | 11/2003 | Walther et al. |
| 2003/0216964 A1 | 11/2003 | MacLean et al. |
| 2003/0216967 A1 | 11/2003 | Williams |
| 2003/0216998 A1 | 11/2003 | Chang et al. |
| 2003/0217003 A1 | 11/2003 | Weinflash et al. |
| 2003/0218066 A1 | 11/2003 | Fernandes et al. |
| 2003/0220834 A1 | 11/2003 | Leung et al. |
| 2003/0225618 A1 | 12/2003 | Hessburg et al. |
| 2003/0225619 A1 | 12/2003 | Dokken et al. |
| 2003/0225688 A1 | 12/2003 | Dobbins |
| 2003/0229590 A1 | 12/2003 | Byrne et al. |
| 2003/0233255 A1 | 12/2003 | Dirienzo |
| 2003/0233278 A1 | 12/2003 | Marshall |
| 2003/0233292 A1 | 12/2003 | Richey et al. |
| 2003/0236704 A1 | 12/2003 | Antonucci |
| 2003/0236712 A1 | 12/2003 | Antonucci et al. |
| 2004/0002916 A1 | 1/2004 | Timmerman et al. |
| 2004/0006487 A1 | 1/2004 | Tari |
| 2004/0010447 A1 | 1/2004 | Asayama |
| 2004/0010462 A1 | 1/2004 | Moon et al. |
| 2004/0015394 A1 | 1/2004 | Mok et al. |
| 2004/0019563 A1 | 1/2004 | Sines et al. |
| 2004/0029569 A1 | 2/2004 | Khan et al. |
| 2004/0031856 A1 | 2/2004 | Atsmon et al. |
| 2004/0039686 A1 | 2/2004 | Klebanoff |
| 2004/0039687 A1 | 2/2004 | Lent et al. |
| 2004/0044606 A1 | 3/2004 | Buttridge et al. |
| 2004/0049451 A1 | 3/2004 | Berardi et al. |
| 2004/0049702 A1 | 3/2004 | Subramaniam et al. |
| 2004/0054931 A1 | 3/2004 | Himmel et al. |
| 2004/0059945 A1* | 3/2004 | Henson ............... G06F 21/6209 726/28 |
| 2004/0064401 A1 | 4/2004 | Palaghita et al. |
| 2004/0078324 A1 | 4/2004 | Lonnberg et al. |
| 2004/0078328 A1 | 4/2004 | Talbert et al. |
| 2004/0078332 A1 | 4/2004 | Ferguson et al. |
| 2004/0094624 A1 | 5/2004 | Fernandes et al. |
| 2004/0111363 A1 | 6/2004 | Trench et al. |
| 2004/0111371 A1 | 6/2004 | Friedman |
| 2004/0111610 A1 | 6/2004 | Slick et al. |
| 2004/0117409 A1 | 6/2004 | Scahill et al. |
| 2004/0117658 A1 | 6/2004 | Klaes |
| 2004/0122736 A1 | 6/2004 | Strock et al. |
| 2004/0122766 A1 | 6/2004 | Brooks et al. |
| 2004/0128248 A1 | 7/2004 | Fujihara et al. |
| 2004/0133787 A1 | 7/2004 | Doughty et al. |
| 2004/0138991 A1 | 7/2004 | Song et al. |
| 2004/0143526 A1 | 7/2004 | Monasterio et al. |
| 2004/0146159 A1 | 7/2004 | Rosen |
| 2004/0149544 A1 | 8/2004 | Dal Ferro |
| 2004/0153378 A1 | 8/2004 | Perkowski |
| 2004/0159700 A1 | 8/2004 | Khan et al. |
| 2004/0162773 A1 | 8/2004 | Del Rey et al. |
| 2004/0172358 A1 | 9/2004 | Lent et al. |
| 2004/0177036 A1 | 9/2004 | Nutahara et al. |

(56) References Cited

U.S. PATENT DOCUMENTS

| | | |
|---|---|---|
| 2004/0181441 A1 | 9/2004 | Fung et al. |
| 2004/0181679 A1* | 9/2004 | Dettinger ............ G06F 21/6245 713/193 |
| 2004/0186773 A1 | 9/2004 | George et al. |
| 2004/0193540 A1 | 9/2004 | Brown et al. |
| 2004/0199406 A1 | 10/2004 | Owens et al. |
| 2004/0210498 A1 | 10/2004 | Freund |
| 2004/0210531 A1 | 10/2004 | Barron et al. |
| 2004/0215507 A1 | 10/2004 | Levitt et al. |
| 2004/0215514 A1 | 10/2004 | Quinlan |
| 2004/0225880 A1 | 11/2004 | Mizrah |
| 2004/0230843 A1 | 11/2004 | Jansen |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0243506 A1 | 12/2004 | Das |
| 2004/0249689 A1 | 12/2004 | Naraki et al. |
| 2004/0249764 A1 | 12/2004 | Delizt et al. |
| 2004/0252012 A1 | 12/2004 | Beenau et al. |
| 2004/0254991 A1 | 12/2004 | Malik et al. |
| 2005/0004864 A1 | 1/2005 | Lent et al. |
| 2005/0006286 A1 | 1/2005 | Fery et al. |
| 2005/0015490 A1 | 1/2005 | Saare et al. |
| 2005/0021363 A1 | 1/2005 | Stimson et al. |
| 2005/0033619 A1 | 2/2005 | Barnes et al. |
| 2005/0035847 A1 | 2/2005 | Bonalle et al. |
| 2005/0040242 A1 | 2/2005 | Beenau et al. |
| 2005/0055306 A1 | 3/2005 | Miller et al. |
| 2005/0060579 A1 | 3/2005 | Dickelman et al. |
| 2005/0066037 A1 | 3/2005 | Song et al. |
| 2005/0071637 A1 | 3/2005 | Shirakawa |
| 2005/0077349 A1 | 4/2005 | Bonalle et al. |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086166 A1 | 4/2005 | Monk et al. |
| 2005/0086167 A1 | 4/2005 | Brake, Jr. et al. |
| 2005/0086177 A1 | 4/2005 | Anderson et al. |
| 2005/0091126 A1 | 4/2005 | Junger |
| 2005/0091138 A1 | 4/2005 | Awatsu |
| 2005/0091492 A1 | 4/2005 | Benson et al. |
| 2005/0097033 A1 | 5/2005 | Pretell et al. |
| 2005/0108102 A1 | 5/2005 | York |
| 2005/0108151 A1 | 5/2005 | York |
| 2005/0114254 A1 | 5/2005 | Condie |
| 2005/0116024 A1 | 6/2005 | Beenau et al. |
| 2005/0120180 A1 | 6/2005 | Schornbach et al. |
| 2005/0125295 A1 | 6/2005 | Tidwell et al. |
| 2005/0125296 A1 | 6/2005 | Munoz et al. |
| 2005/0125315 A1 | 6/2005 | Tidwell et al. |
| 2005/0125337 A1 | 6/2005 | Tidwell et al. |
| 2005/0125338 A1 | 6/2005 | Tidwell et al. |
| 2005/0125339 A1 | 6/2005 | Tidwell et al. |
| 2005/0125350 A1 | 6/2005 | Tidwelt et al. |
| 2005/0125351 A1 | 6/2005 | Tidwell et al. |
| 2005/0125360 A1 | 6/2005 | Tidwell et al. |
| 2005/0137951 A1 | 6/2005 | Michelassi et al. |
| 2005/0137982 A1 | 6/2005 | Michelassi et al. |
| 2005/0144143 A1 | 6/2005 | Freiberg |
| 2005/0149386 A1 | 7/2005 | Agura et al. |
| 2005/0149440 A1 | 7/2005 | Michelassi et al. |
| 2005/0154664 A1 | 7/2005 | Guy et al. |
| 2005/0159986 A1 | 7/2005 | Breeland et al. |
| 2005/0160051 A1 | 7/2005 | Johnson |
| 2005/0167342 A1 | 8/2005 | Vullride et al. |
| 2005/0171898 A1 | 8/2005 | Bishop et al. |
| 2005/0171901 A1 | 8/2005 | Rosenblatt et al. |
| 2005/0177523 A1 | 8/2005 | Weiss et al. |
| 2005/0182654 A1 | 8/2005 | Abolfathi et al. |
| 2005/0182735 A1 | 8/2005 | Zager et al. |
| 2005/0193056 A1 | 9/2005 | Schaefer et al. |
| 2005/0193208 A1 | 9/2005 | Charrette et al. |
| 2005/0199708 A1 | 9/2005 | Friedman |
| 2005/0203857 A1 | 9/2005 | Friedman |
| 2005/0206499 A1 | 9/2005 | Fisher |
| 2005/0209914 A1 | 9/2005 | Nguyen et al. |
| 2005/0216421 A1 | 9/2005 | Barry et al. |
| 2005/0234789 A1 | 10/2005 | Czyzewski et al. |
| 2005/0240474 A1 | 10/2005 | Li |
| 2005/0246627 A1 | 11/2005 | Sayed |
| 2005/0256802 A1 | 11/2005 | Ammermann et al. |
| 2005/0261916 A1 | 11/2005 | McCall et al. |
| 2005/0261995 A1 | 11/2005 | Phelan |
| 2005/0273425 A1 | 12/2005 | Yamazaki |
| 2005/0278641 A1 | 12/2005 | Mansour et al. |
| 2005/0283429 A1 | 12/2005 | Bates et al. |
| 2005/0289051 A1 | 12/2005 | Allin et al. |
| 2006/0005017 A1* | 1/2006 | Black ................ H04L 63/0428 713/165 |
| 2006/0005039 A1 | 1/2006 | Hsieh |
| 2006/0015463 A1 | 1/2006 | Gupta et al. |
| 2006/0020783 A1 | 1/2006 | Fisher |
| 2006/0029261 A1 | 2/2006 | Hoffman et al. |
| 2006/0031718 A1 | 2/2006 | Thornhill et al. |
| 2006/0036553 A1 | 2/2006 | Gupta et al. |
| 2006/0041540 A1 | 2/2006 | Shannon |
| 2006/0064329 A1 | 3/2006 | Abolfathi et al. |
| 2006/0080230 A1 | 4/2006 | Freiberg |
| 2006/0080243 A1 | 4/2006 | Kemper et al. |
| 2006/0080254 A1 | 4/2006 | Chigira et al. |
| 2006/0095350 A1 | 5/2006 | Hall et al. |
| 2006/0116949 A1 | 6/2006 | Wehunt et al. |
| 2006/0143077 A1 | 6/2006 | Prorock |
| 2006/0143117 A1 | 6/2006 | Chigira et al. |
| 2006/0149671 A1 | 6/2006 | Nix et al. |
| 2006/0173706 A1 | 8/2006 | Allin et al. |
| 2006/0249574 A1 | 11/2006 | Brown et al. |
| 2006/0259766 A1 | 11/2006 | Rasti |
| 2006/0261927 A1 | 11/2006 | Kelly et al. |
| 2006/0271397 A1 | 11/2006 | Allin et al. |
| 2006/0271477 A1 | 11/2006 | Allin et al. |
| 2006/0271478 A1 | 11/2006 | Allin et al. |
| 2006/0271479 A1 | 11/2006 | Allin et al. |
| 2006/0271480 A1 | 11/2006 | Allin et al. |
| 2006/0272024 A1* | 11/2006 | Huang .................... G06F 21/55 726/26 |
| 2006/0274970 A1 | 12/2006 | Seki et al. |
| 2007/0011089 A1 | 1/2007 | Deschryver |
| 2007/0019806 A1 | 1/2007 | Conley et al. |
| 2007/0034700 A1 | 2/2007 | Poidomani et al. |
| 2007/0078771 A1 | 4/2007 | Allin et al. |
| 2007/0118479 A1* | 5/2007 | Halsema ............ G06F 21/6245 705/51 |
| 2007/0136211 A1 | 6/2007 | Brown et al. |
| 2007/0156521 A1 | 7/2007 | Yates |
| 2007/0179883 A1 | 8/2007 | Questembert |
| 2007/0186252 A1 | 8/2007 | Maggio |
| 2007/0203850 A1 | 8/2007 | Singh et al. |
| 2007/0208671 A1 | 9/2007 | Brown et al. |
| 2007/0215688 A1 | 9/2007 | Routhenstein |
| 2007/0234408 A1 | 10/2007 | Burch et al. |
| 2007/0234409 A1 | 10/2007 | Eisen |
| 2007/0265924 A1 | 11/2007 | Schwarz |
| 2007/0282796 A1* | 12/2007 | Evenhaim ............... G16H 50/70 |
| 2007/0283436 A1 | 12/2007 | Duffield et al. |
| 2008/0010202 A1 | 1/2008 | Schwarz |
| 2008/0114724 A1* | 5/2008 | Indeck ............ G06F 17/30595 |
| 2008/0141373 A1* | 6/2008 | Fossen .................. G06F 21/564 726/23 |
| 2008/0184315 A1 | 7/2008 | Ellis et al. |
| 2008/0320567 A1 | 12/2008 | Shulman et al. |
| 2009/0043651 A1 | 2/2009 | Schwarz |
| 2009/0100508 A1 | 4/2009 | Labaton |
| 2009/0150937 A1 | 6/2009 | Ellis et al. |
| 2009/0192940 A1 | 7/2009 | Mann, III et al. |

FOREIGN PATENT DOCUMENTS

| | | |
|---|---|---|
| EP | 0855659 | 7/1998 |
| EP | 0884877 | 12/1998 |
| EP | 0917119 | 5/1999 |
| EP | 1014318 | 6/2000 |
| EP | 1014318 A2 | 6/2000 |

(56) References Cited

FOREIGN PATENT DOCUMENTS

| | | |
|---|---|---|
| EP | 1022664 | 7/2000 |
| EP | 1056043 | 11/2000 |
| EP | 0590861 | 1/2001 |
| EP | 1089516 | 4/2001 |
| JP | H10-187467 | 7/1998 |
| JP | 200324329 | 11/2000 |
| JP | 2001134672 | 5/2001 |
| JP | 2005-242976 | 9/2005 |
| WO | WO 97/43736 | 11/1997 |
| WO | WO 1998-10368 | 3/1998 |
| WO | WO 1998-29822 | 7/1998 |
| WO | WO 99/40507 A1 | 8/1999 |
| WO | WO 1999-39291 | 8/1999 |
| WO | WO 99/52051 | 10/1999 |
| WO | WO 00/68858 | 11/2000 |
| WO | WO 2001-011526 | 2/2001 |
| WO | WO 01/18656 A1 | 3/2001 |
| WO | WO 01/35355 | 5/2001 |
| WO | WO 01/43084 | 6/2001 |
| WO | WO 01088659 | 11/2001 |
| WO | WO 02/17082 A1 | 2/2002 |
| WO | WO 2004/079603 | 9/2004 |
| WO | WO 2005-101975 | 11/2005 |
| WO | WO 2006-011904 | 2/2006 |
| WO | WO 2006-060370 | 6/2006 |
| WO | WO 2006-105092 | 10/2006 |
| WO | WO 2006-116772 | 11/2006 |

OTHER PUBLICATIONS

Hasting, Nelson et. al., A Case Study of Authenticated and Secure File Transfer The Iowa Campaign Finance Reporting System, IEEE (1997).
Alshawi, M et. al., An IFC Web Based Collaborative Construction Computer Environment Wisper (1999).
Microsoft, CNBC on MSN Money Microsoft Money 2003 Deluxe, Aug. 2002.
Kilian-Kehr, Mobile Security with Smartcards, Dissertation, Apr. 8, 2002.
Youll, James, Peer to Peer Transactions in Agent Mediated Electronic Commerce, Aug. 10, 2001.
Van Collie, Shimon Craig, Problem Disbursement Control Needed Construction Loan Tool from PriMerit NewTrend, Apr. 1990.
Brown, Keith, The Builders Revolution, Internet Archive Wayback Machine, Jan. 1998.
Yee, Bennet, Using Secure Coprocessors, May 1994.
Welcome to MUSE, Apr. 26, 1999.
Software Product Description, Safety, vol. 1.4, Comprehensive Data Safety for your VMS Systems (1995).
Kutler, A Different Drummer on the Data Highway, American Banker, Section: No. 91, vol. 160, May 12, 1995, p. 14.
Epper, A Player Goes After Big Bucks in Cyberspace, American Banker, vol. 160, No. 86, ISSN: 0002-7561, May 5, 1995, p. 17.
Berry et al., A potent new tool for selling databse, Business Week, Cover Story, Sep. 5, 1994, pp. 56-62.
Applets, java.sun.com, May 21, 1999.
Associates National Bank (DE) Credit Card, The Associates, www.theassociates.com/consumer/credit_cards/main.html , Apr. 6, 1999, 6 pages.
At Your Request, www.wingspanbank.com, Sep. 28, 1999.
Anonymous, Aversion Therapy: Banks Overcoming Fear of the 'Net to Develop Safe Internet-based Payment System w/ Netscape Communicator, Network World, ISSN: 0887-7661, Dec. 12, 1994.
JAVA, Banking on JAVA(TM) Technology, java.sun.com, May 21, 1999.
Bechtel Construction Operations Incorporated Standardizes on Primavera's Expedition Contract Management Software, Business Wire, Jul. 27, 1999.
Fusaro, Roberta, Builders Moving to Web tools Computerworld, Nov. 16, 1998, vol. 32, No. 46, pp. 51, 53.
Anonymous, CORBA Overview, arch2.htm at pent21.infosys.tuwien.ac.at, May 25, 1999.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Marlin, Chasing Document Management, Inform, vol. 13, No. 4, April 199, p. 76-82.
Consortium Created to Manage Common Electronic Purse Specifications, http://www.visa.com/av/news/PRmisc051199.vhtml, printed Feb. 23, 2001.
Construction Financing to Build Your Own Home, ISBN: 0962864307, Jul. 1990.
Civitello Jr., Construction Operations Manual of Policies and Procedures, Third Edition, 2000.
Marchman, Construction Scheduling with Primavera Project Planner, May 25, 1999.
Chester, Cross-platform integration with XML and SOAP, IT PTO Sep.-Oct. 2001.
Mitchell, Cyberspace: Crafting Software . . . , Business Week, Feb. 27, 1999, pp. 78-86.
Friedman, Dictionary of Business Terms, Barron's Third Edition, Copyright 2000.
Strassel, Dutch Software Concern Experiments with Electronic 'Cash' in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise JAVABEANS(TM) Technology: Server Component Model for the Java(TM) platform, java.sun.com, May 2, 1999.
Seibert, Paul, Facilities Planning & Design for Financial Institutions Bankline Publications, 1996, ISBN: 1-55738-780-X.
Owens, David, Facilities Planning & Relocation RSMeans, 1993, ISBN: 0-87629-281-3.
Maize, Fannie Mae on the Web, Doucment ID: 52079, May 8, 1995.
FreeMarkets, printed on Apr. 26, 1999.
The Gale Group, G&D America's Multi-application Smart Card Selected for Combined Payroll and 'Virtual Banking' Program in Mexico, Business Wire, Apr. 24, 1998, p. 241047.
Getting Smart with Java: Sun Micro Says American Express to Use Java for Smart Card, ABCNews.com, printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.
Meredith, Internet bank moves closer to virtual reality, USA Today, May 5, 1995.
Larsen, Amy, Internet goes to Work for Builders, InterWeek, Nov. 16, 1998, Issue 741.
Radosevich, Is Work Flow Working?, CNN.com, Apr. 6, 1999 at <http://www.cnn.com/TECH/computing/9904/06/workflow/ent.idg, p. 1 of 5, retrieved from the internet on Nov. 28, 2005.
JAVA, JAVA (TM) Technology in the Real World, java.sun.com, May 21, 1999.
JAVA, JAVA(TM) Remote Method Invocation (RMI) Interface, java.sun,com, 05/32/1999.
JAVA, JAVA(TM) Servlet API, java.sun.com, May 21, 1999.
Frank, John N. Frank, Beyond Direct Mail, Credit Card Management, vol. 9, Iss. 5, Aug. 1996, 4pgs.
OMG, Library, www.omg.com, May 25, 1999.
Mary C. Lacity, et al., Mary C. Lacity, et al., The Information Systems Outsourcing Bandwagon, Sloan Management Review, vol. 35, No. 1, Fall 1993, p. 73-86.
Method of Protecting Data on a Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, Nov. 9, 1994 WSJ B9.
Sirbu, et al, NetBill: An Internet Commerce System Optimized for Network Delivered Services, printed on Feb. 27, 1995.

(56) References Cited

OTHER PUBLICATIONS

Mitchell, Netlink Goes After an Unbanked Niche, Card Technology, ISSN: 1093-1279, Sep. 1999, p. 22.
Barnham, Network Brings Together Producers and Companies, Document ID: 17347.
Houlder, OFT Gives the Individual Top Priority: Report Calls for Deregulation of Business Lending, Document ID: 91716, Jun. 8, 1994.
Omware, Inc., Web Pages, Feb. 2000, Retrieved from http://web.archive.org/web20000226033405/www.omware.com/products.html, Retrieved from the interneet Nov. 28, 2005.
Anonymous, Overview of CORBA, May 25, 1999.
Harris, Planning Using Primavera Project Planner P3 Version 3.0, User Guide, Copyright 1999 by Eastwood Harry Pty Ltd., 1999.
Point for Windows Version 3.x Interface Marketing Guide.pdf.
Johnston, Pondering Passport: Do You Trust Microsoft With Your Data?, www.pcworld.com/resource/printable/article/0.aid,63244,00.asp, Sep. 24, 2001.
Primavera Systems Delivers Expedition Express,Business Wire, Feb. 23, 1999.
Primavera Systems, Inc.—How the World Manages Projects, Expedition Contract Control Software, www.primavera.com, Jun. 23, 2005.
Primavera and PurchasePro.com to Create E-Commerce Marketplace for Construction Industry, Primavera Ships P3, version 3.0, www.purchasepro.com/, Sep. 21, 1999, pp. 1-3.
Product Data Integration Technologies, Inc., Step Integratin Authors, printed on Apr. 26, 1999.
Resource Center: Consolidated Edison Selects GE TPN Post, printed Apr. 26, 1999.
Kormann, Risks of the Passport Single Signon Protocol, Computer Networks, Elsevier Science Press, vol. 33, Sep. 20, 2003, pp. 51-58.
SBA: Pro-Net, U.S. Small Business Administration Procurement Marketing and Access Network, Last Modified: Apr. 1, 1999.
Jepsen, SOAP Cleans up interoperability problems on the web, IT PTO, Jan./Feb. 2001.
Safe Single-Sign-On Protocol with Minimal Password Exposure No Decryption and Technology Adaptivity, IBM Corporation, TDB 03-95, Order 95A, Mar. 1, 1995, pp. 245-248.
Deckmyn, Dominique, San Francisco manages $45M project via web-based Service, Computerworld, Aug. 9, 1999, vol. 33, No. 32, p. 14.
Sun Microsystems, Inc., Schema for Representing CORBA Objects in an LDAP directory, May 21, 1999, pp. 1-9.
Jakobsson et al., Secure and lightweight advertising on the web, Computer Networks, 31 (1999) 1101-1109.
Servlet/Applet/HTML Authentication Process with Single Sign-On, IBM Corporation, IBM Order: 00A6004, Jan. 1, 2000.
Shibata, Seventh International Conference on Parallel and Distributed Systems: Workshops, IEEE Computer Society, Jul. 4-7, 2000.
Siebel, Siebel: Ensuring Customer Success, www.siebel.com, Nov. 17, 1999.
SmartAxis, How it works, http://www.smartaxis.co.uk/seller/howitworks.html, printed on Feb. 23, 2001.
Mosig, Richard, Software Review: The Construction Project Manager Cost Engineering, Jan. 1996, vol. 38, No. 1, pp. 7-8.
Hernandez, Tomas et al., Software Solutions Building Design & Construction, Nov. 1999, vol. 40, No. 11, pp. 38-40.
Thomas Publishing Company, SoluSource: for Engineers by Engineers, Thomas Publishing Company, Apr. 26, 1999.
JAVA, Staying in Touch with JNDI, java.sun.com, May 21, 1999.
Summary of The At Your Request Architecture, First USA Bank Confidential and Proprietary, Apr. 2, 1999, pp. 1-8.
Taylor, Telecommunications Demand Analysis in Transition, Proceedings of the 31st Hawaii International Conference on System Sciences, vol. 5, Jan. 6-9, 1998, pp. 409-415.
Temporary Global Passwords, IBM Corporation, IBM TDB v36, n3, 03-93, Order 93A 60636, Mar. 1, 1993, pp. 451-454.
Cotts, David, The Facility Management Handbook Second Edition AMACM, 1998, ISBN: 0-8144-030-8.
JAVA, The JDBC(TM) Data Access API, java.sun.com, May 21, 1999.
Carden, Philip, The New Face of Single Sign-on, Network Computing, http://www.networkcomputing.com, printed Dec. 29, 2000, 4 pages.
The check is in the email, Information Today, vol. 12, No. 3, ISSN: 8755-6286, 03/01995.
Thomas Publishing Company, ThomasNet, Apr. 26, 1999.
Ritz, Total Construction Project Management, McGraw-Hill, 1994.
Hewlett-Packard Company, Understanding Product Data Management, Hewlett-Packard Company.
OMG, Welcome to OMG's CORBA for Beginners Page!, www.omg.co, May 25, 1999.
OMG, What is CORBA?, www.omg.com, May 25, 1999.
Fujimura et al., XML Voucher: Generic Voucher Language, Feb. 2003.
ECharge, eCharge Corporation, www.echarge.com, Dec. 3, 1999.
Morgan, Lisa, "Changing Times in Network Security", Apr. 17, 2000, Informationweek, n782, pp. 140-144.

\* cited by examiner

SYSTEM AND METHOD FOR PREVENTING IDENTITY THEFT OR MISUSE BY RESTRICTING ACCESS

CROSS REFERENCE TO RELATED APPLICATION

This application is a continuation of U.S. patent application Ser. No. 11/900,982, filed on Sep. 14, 2007, which is a continuation-in-part of U.S. patent application Ser. No. 10/126,920, now U.S. Pat. No. 7,272,857, filed on Apr. 19, 2002 and titled System and Method For Preventing Identity Theft or Misuse By Restricting Access, which application claims priority from U.S. Provisional Patent Appln. Ser. No. 60/284,940, filed Apr. 20, 2001 and titled System and Method For Network File Filtering, the contents of which are herein incorporated by reference U.S. patent application Ser. No. 11/900,982 is incorporated herein by reference in its entirety.

FIELD OF THE INVENTION

The invention relates to the field of data security. More particularly, the invention relates to detecting and protecting sensitive data, such as personally identifiable information ("PII"), in computer files. The invention also relates to systems and methods for restricting access to files that have been identified as likely containing sensitive data, such as PII, and for providing security, such as restricted access and/or encryption, for those files.

BACKGROUND OF THE INVENTION

Many businesses receive correspondence, such as from customers or vendors, which may contain sensitive data, such as confidential financial information. This correspondence may be stored in computer data files. For example, the stored correspondence may include emails that are stored in email archives or other storage. The stored correspondence may also include documents scanned into a computer system and stored as text or other data files. Often sensitive and confidential information is stored in business computer data files, such as PII.

PII is information which might be used to uniquely identify, contact, or locate a single person, either alone or in combination with some other information, or from which identifiable information can be derived. PII includes such information as name; national identification number; telephone number; street address; email address; IP address; vehicle registration number; driver's license number; biometrics; financial profiles; credit card numbers; and digital identity.

A number of laws have been enacted in the last several years to protect confidential information of individuals, such as PII. For instance, Canada has enacted the Privacy Act and the Personal Information Protection and Electronic Documents Act (PIPEDA). Legal frameworks in the European Union to protect privacy include Article 8 of the European Convention on Human Rights; Directive 95/46/EC (Data Protection Directive); and Directive 2002/58/EC (the E-Privacy Directive). Additional information on efforts to protect privacy in the European Union can be found at the website <<http://ec.europa.eu/justice_home/fsj/privacy/index_en.htm>>. Individual European countries also have enacted privacy protection, for example the UK Data Protection Act of 1998; the Irish Data Protection Acts of 1998 and 2003; and the UK Regulation of Investigatory Powers Act of 2000.

Both the United States and individual states have similarly enacted laws to protect sensitive and confidential information, including PII. The Constitution of the State of California includes a right to privacy in Article 1, Section 1. California also passed the Online Privacy Protection Act (OPPA) of 2003 which requires all owners of commercial web sites or online services that collect personal information from California residents to conspicuously post their privacy policies on their websites and comply with those posted policies; disclose in the privacy policies the types of PII collected and must identify, generally, any third parties with whom that information might be shared, and under what circumstances; provide a description of the process (if one exists), by which a visitor can request changes to any of that information; describe the process by which the operator of a Web site notifies users of changes to that privacy policy; and identify the effective date of the privacy policy.

Federal laws in the United States to protect PII include the Privacy Act of 2005; the Information Protection and Security Act; the Identity Theft Prevention Act of 2005; the Online Privacy Protection Act of 2005; the Consumer Privacy Protection Act of 2005; the Anti-phishing Act of 2005; the Social Security Number Protection Act of 2005; and the Wireless 411 Privacy Act.

Files containing sensitive and protected information may be accessible by a large number of people in a data-driven company, such as a bank. Since it is not always known which files contain sensitive information, when they were received or archived, or where they are currently stored, it is sometimes difficult to identify and protect the files that contain sensitive information. The files containing sensitive information may occupy a large amount of space in a computer system. It is time consuming to go through each file to determine if sensitive information is contained in the files.

BRIEF SUMMARY OF THE INVENTION

The inventions disclosed herein relate to a system and method to "filter" files for PII and other sensitive information, to identify files likely to contain such sensitive information and to protect those files.

According to one embodiment the invention, a system and method for network file filtering includes scanning at least one data file for the density of a selected pattern, for example a pattern that tends preferentially to be present in proprietary data in the business area of the data being filtered. Additionally, files containing the selected pattern may be further analyzed to filter the files for sensitive information. For example, the data may be analyzed to see if it contains a valid check digit. The system and method of the invention can then restrict access to the file if the density of the selected pattern in the text file is greater than or equal to a predetermined key word density threshold, and/or if further analysis indicates that sensitive data are likely to be contained in the file.

DETAILED DESCRIPTION OF THE INVENTION

The invention is described in relation to a network file filtering system and method. The characteristics and parameters pertaining to the system and method may be applicable to other types of file filtering systems and other data or file identification or search systems. Like elements are referred to using like numerals for clarity throughout the drawings and description.

Figure 1:
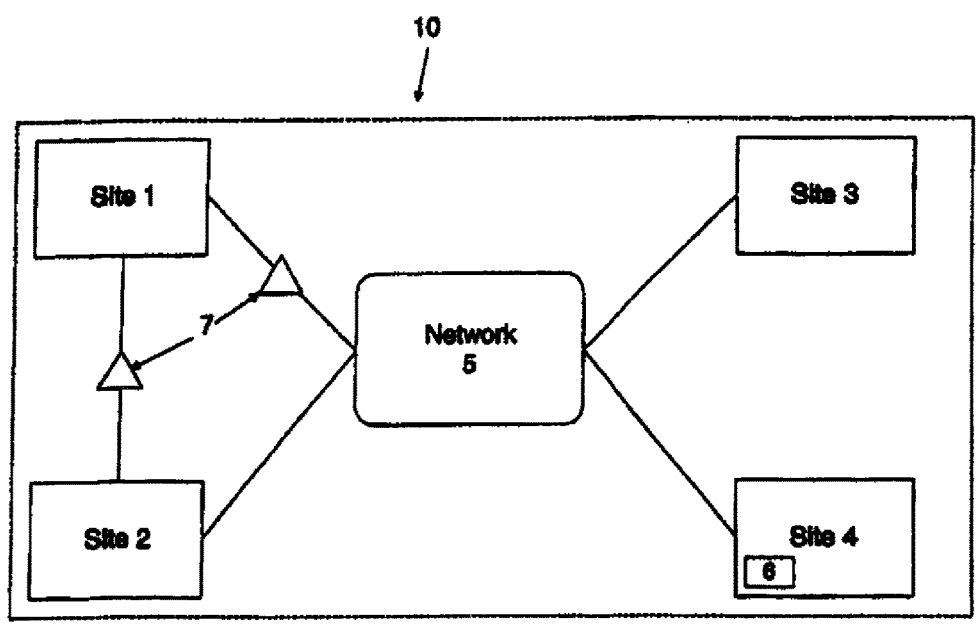
FIG. 1 is a block diagram illustrating one embodiment of a system suitable for implementing the network file filtering system and method according to the invention.

FIG. 1 is a block diagram illustrating one embodiment of a system 10 implementing the file filtering system and method according to the invention. The system 10 includes network nodes or sites 1-4, a network 5 and a file filtering system 6. In one embodiment, a file filtering system may reside on one of the sites 1-4. In the embodiment illustrated, file filtering system 6 resides at site 4. In one embodiment, file filtering system 6 may reside on a plurality of sites 1-4 or at all sites 1-4 of the system 10.

Although only four sites or nodes 1-4 are shown, any number of sites 1-4 may exist in system 10. In one embodiment, system 10 may include only one site 1-4. In another embodiment, system 10 may include as many sites as necessary or desired by a user.

In one embodiment, system 10 may include a server for managing network-related traffic. In one embodiment, each of sites 1-4 may include a network server. The server may be or include, for instance, a workstation running Microsoft Windows™ NT™, Windows™ 2000, Windows™ Vista™, Windows XP™, Windows™ Mobile™, Unix, Linux, Xenix, IBM AIX™, Hewlett-Packard UX™, Novell Netware™, Sun Microsystems Solaris™, OS/2™, BeOS™, Mach, Apache, OpenStep™, Mac OS X™, GAME BOY™, PXP™ or any other operating system or platform now known or later developed.

Each of sites 1-4 may communicate to each other and to network 5 through communications link 7. Communications link 7 may be a part of network 5 in one embodiment. Communications link 7 may be, include or interface to any one or more of, for instance, point-to-point communication, such as with a dedicated line or via the Internet, an intranet, a PAN (Personal Area Network), a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or FDDN (Fiber Distributed Data Networks) or CDDI (Copper Distributed Data Interface) connections.

Communications link 7 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth™ radio link, or an IEEE 802.11-based radio frequency link. Communications link 7 may yet further be, include or access any one or more of an RS-232 serial connection, an IEEE-1394 (Firewire) connection, an IrDA (infrared) port, a SCSI (Small Computer Serial Interface) connection, a USB (Universal Serial Bus) connection or other wired or wireless, digital or analog interface or connection.

Sites 1-4 may communicate with each other and to network 5 using network enabled code. Network enabled code may be, include or interface to, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Figure 2:
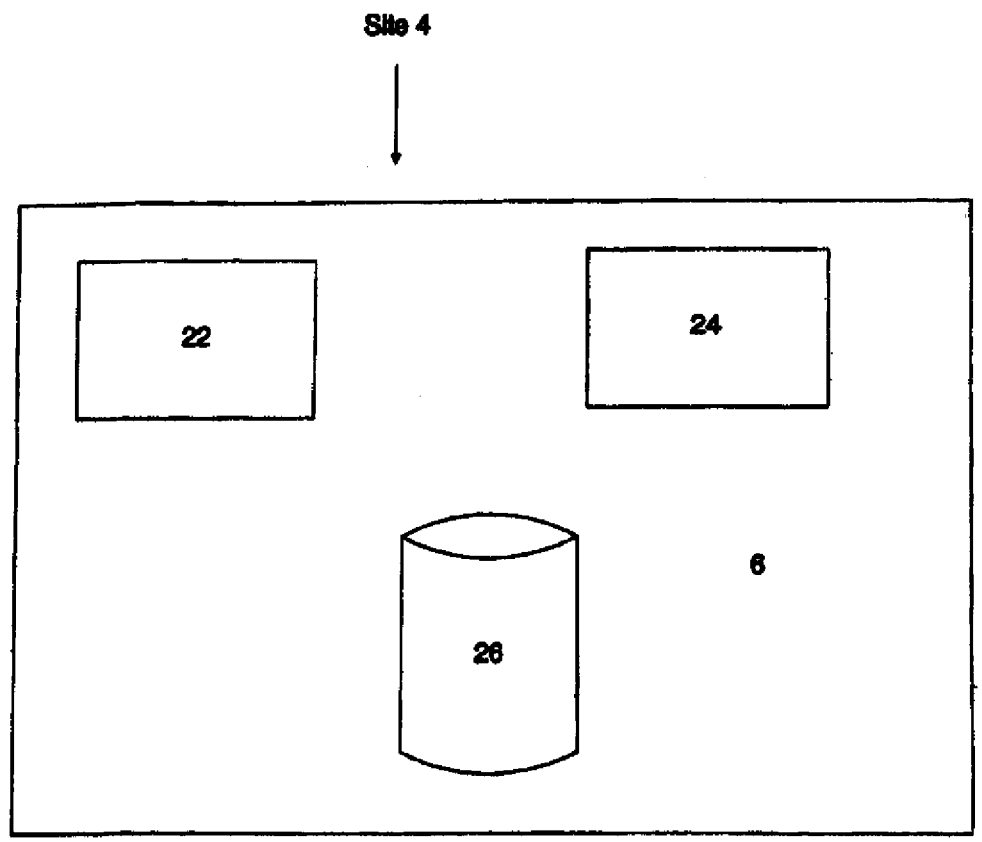
FIG. 2 is a block diagram of one embodiment of a file filtering system according to the invention.

FIG. 2 is a block diagram illustrating one embodiment of a file filtering system according to the invention. File filtering system 6 of FIG. 1 may include a scanning module 22, a restricting system 24 and a database 26. In one embodiment, scanning module 22 may be used to scan files stored at sites 1-4 of a system 10 for confidential financial information such as credit card numbers. Restricting system 24 may be used to restrict the files found to have confidential financial information from access by unauthorized user or uses.

Database 26 may be used to store data regarding scanning criteria, restricting criteria, scanning and restricting algorithms, identification of files that need to be restricted and any other data associated with filtering files having sensitive information in a system 10. The database 26 may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention.

Figure 3:
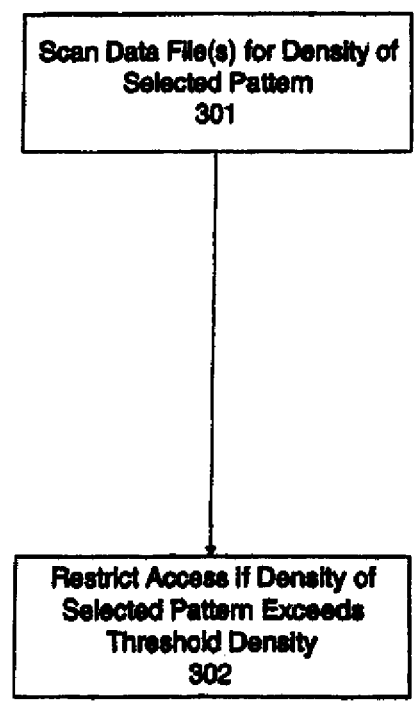
FIG. 3 is a flow diagram illustrating one method of filtering files according to the invention.

FIG. 3 is a flow diagram illustrating one embodiment of a method for filtering files in a system 10. At step 301, the scanning module 22 may scan data files in system 10 for density of a key word. At step 302, the restricting system 24 may restrict access to each file having a key word density greater than or equal to a threshold density.

As will be described in more detail below, the various processes illustrated in FIG. 3 may be performed by a system, such as the system illustrated in FIGS. 1 and 2. The steps illustrated in FIG. 3 will now be described in greater detail.

At step 301, the scanning module 22 may scan at least one data file and the system 10 for density of a selected pattern. In one embodiment, scanning the data files for the density of a selected pattern may include scanning the data file for occurrences of the selected pattern and determining the density of the selected pattern in the data file. In one embodiment, the density of the selected pattern may be determined by dividing the number of occurrences of the selected pattern by the size of the data file which may be given in any format known today or later developed.

In one embodiment, scanning the data file for the selected pattern density may also include comparing the density of the selected pattern in the file to a threshold density. In one embodiment, the threshold density may be a predetermined threshold density. In another embodiment, the threshold density may be a selectable threshold density. The threshold density may be selected by a systems administrator or other user. The threshold density may be selected based on the type of data being scanned. The types of data being scanned may include ASCII (American Standard Code for Information Interchange) text, streaming audio, graphics, etc.

In one embodiment, the threshold density may be selected based on the length of the file. For example, the longer the file is, the lower the threshold density. In one embodiment, the threshold density may be a variable threshold density that varies with the size of the file scanned.

In one embodiment, the threshold density may be determined after analyzing the selected pattern density in at least one data file. The threshold density may be based on predetermined formulas or trial and error methods.

In one embodiment, the selected pattern may include a key word string. In one embodiment, the key word string may be a key word string of a predetermined length including at least one predetermined substring. For example, the key word string may be a numeric string having a length equal to the length of a standard credit card number. In one embodiment, the predetermined substring may be a substring associated with a specific credit card issue. For example, the substring may be the first four digits of a credit card number identifying a specific bank issuing the credit card if the filtering is being done by a bank or other financial service company. The key word string may also be alphanumeric or comprise other characters in addition to alphanumeric characters.

The selected pattern may be any pattern that may be used in an industry for sensitive information. Thus, the pattern may be determined by finding patterns that tend preferentially to be present in proprietary data in the business area of the data being filtered. For example, if the filtering is being performed by a chemical company, a chemical name or process technical term may be used for the selected pattern. In the financial services industry, the selected pattern may comprise the format of a credit card number, i.e. a string of numbers either 15 or 16 digits in length. In another embodiment, the selected pattern may include a non-text pattern. For example, the selected pattern may be a symbol or other graphic representation.

In one embodiment, the selected pattern may include a plurality of selected patterns. For example, the selected patterns may include social security number, date of birth, and credit card number. The threshold density of the selected patterns may be an aggregate threshold density. For example, the density of the set of selected patterns may calculated by determining the individual density of each selected pattern. The individual densities of the selected patterns that are predetermined to be "less useful" may be subjected to a range constraint so that if the individual density of the less useful pattern is below the range, the individual density will be set to the minimum density of the range. All of the individual densities may be multiplied together to produce a product density. The product density may then be compared to the aggregate threshold density. The aggregate threshold density may be determined empirically.

In one embodiment, files that are determined to include the selected pattern or patterns may be subjected to further analysis. For example, files that are identified using the selected pattern may be analyzed to see if the data that comprise the selected pattern(s) within that file contain a check digit. A check digit is a form of redundancy check used for error detection that consists of a single digit computed from the other digits in the message. In this embodiment, files may be identified according to a key word string. The identified files may then be further scanned for a check digit that corresponds to the type of information that tend preferentially to be present in proprietary data in the business area of the data being filtered by the key word string.

For example, the key word string may correspond to a standard credit card number. Files that are identified as containing the key word string search may then be further scanned to see if the data corresponding to the key word string contain a valid check digit for a credit card. In this embodiment, the data that correspond to the key word string may be used to calculate a check digit using the Modulo 10 (Mod 10) formula, also known as the Luhn algorithm (as described in U.S. Pat. No. 2,950,048 to Luhn, titled Computer for Verifying Numbers). The calculated check digit may be compared to the data that correspond to the check digit in the credit card number. For example, the check digit for many popular credit cards (VISA™, MasterCard™, Discovery™, American Express™) is the final digit of the credit card number. Accordingly, if the data that correspond to the key word string also contain a valid Mod 10 check digit, then it is likely that the file contains sensitive credit card information.

Other examples of information that use check digits include Universal Product Codes; ISBNs, National Provider Identifiers, used in the healthcare industry; the North American CUSIP number; the International SEDOL number; the International Securities Identifying Number (ISIN); the International CAS registry number's final digit; the final digit of a POSTNET code; the final digit of an ISSN code; the final digit of a DUNS number; and the ninth digit of a Vehicle Identification Number (VIN).

By combining several selected patterns or discriminators that are particularly usable, in the manner described above, a discriminator may be obtained that performs much better than any of the individual selected patterns. A well chosen combination of selected patterns may result in filtering that produces a very low alarm rate (rate of filtering files that do not need filtering). For example, in a financial services company, a combination of addresses and credit card numbers may produce an alarm rate of less than 10%. Protecting the extra 10% of files would be negligible overhead compared to the time and cost investment of examining each data file for sensitive data.

In one embodiment, the selected threshold density may be predetermined based on the type of data for which the scan is performed. In another embodiment, the selected threshold density may be selected after scanning at least one data file to determine what the selected pattern should be. The selected threshold density may be selected by a user or selected by performing an electronically performed algorithm to select the selected pattern.

In another embodiment, identified files that are found to have an accurate check digit in the portion of the file that corresponds to all or part of the special pattern may further be analyzed to determine if the percentage of accuracy exceeds that which would be expected in random data. For example, in a document where random data appear to match credit card numbers, normally the check digit will be correct only 10% of the time. By examining the fraction of credit card number patterns that pass the check digit test, it is possible to tell when this fraction significantly exceeds 10%, which gives a very good indication that genuine credit card numbers are present. Similar logic can be used anywhere that data with check digits or error detecting components exist, since the properties of the checking information will be reflected in the statistics of data found in files, and will differ from random or accidentally matching data.

At step 302, the restricting system 24 may restrict access to each file where the selected pattern density is greater than or equal to the threshold density, or where the files are located from the key word string search. In another embodiment, the restricting system 24 may restrict access to each file identified by the use of a combination of selected patterns or discriminators and optionally further analysis.

In one embodiment, restricting access to the file may include activating a security system for each file having a selected pattern density greater than or equal to a threshold density and optionally where further analysis confirms the likelihood of the presence of the sensitive data. In one embodiment, the file that is identified as likely to contain sensitive information may be assigned an identifier or label to identify the file as a sensitive file. The identifier or label may alert system 10 to activate restricting system 24 when access of the sensitive file is attempted. In one embodiment, the identifier may be stored in database 26.

In one embodiment, the restricting system may perform an algorithm to restrict access to all files having a sensitive file identifier stored in database 26.

In one embodiment, activating the security system may include scanning the database 26 or all of the files in system 10 to identify data files having an identifier stored in database 26 or having an associated sensitive file identifier.

In one embodiment, the security system may include restricting access to a sensitive file by password protecting the file. In one embodiment, restricting access to a file may include controlling access to the file based on the time of day when a file is being accessed. In one embodiment, access to a sensitive file may be restricted based on the time of day a specific user is trying to access the file. In another embodiment, the sensitive file may be secured by encrypting the file, for example by use of symmetric key encryption such as DES, IDEA or AES; asymmetric or public key encryption; checksums; cyclic redundancy checks; message authentication codes; digital signatures; or combinations or variations of the foregoing. In this embodiment, only persons having the corresponding key can access the information in the sensitive file.

In one embodiment, access to the file may be restricted based on the user trying to access the file. In one embodiment, only certain users or a certain subset of users may have access to the file. For example, for a first set of restricted files, only clerical staff may have access to the files in the first set. For a second set of restricted files, only management may have access to the files of the second set.

In one embodiment, the place of access by the user may be restricted. For example, a user may only be able to access the file from the user's own desktop terminal. In one embodiment, the user may only be able to access the file from a certain central terminal.

In one embodiment, the type of file authorization assigned to the user may be used to restrict access to the file. For example, a user may be authorized to view certain types of files such as financial information, etc. In one embodiment, a person assigned a highly sensitive file authorization may not be able to view a low sensitivity file. In another embodiment, a user having authorization to view low sensitivity files may not have authorization to view files having a higher sensitivity. Thus, there may be a minimum or maximum security authorization, or both, assigned to the file to restrict access.

In one embodiment, the type of privileges authorization assigned to the user may be used to restrict access to a file. In one embodiment, the types of privileges authorization may include privilege to view a file, privilege to copy a file, privilege to back up a file, or privilege to edit a file. In one embodiment, controlling access based on the types of privileges authorized may include a privilege ceiling where a user with a greater amount of privilege than the privilege ceiling may be restricted from accessing the sensitive file. Thus, a user with the privilege of copying or editing files may not have access to a restricted file having a privilege ceiling of viewing the file, whereas a user having a privilege of viewing files would have access to the file.

In one embodiment, controlling access based on the types of privileges authorized may include a privilege floor where a user with a lesser amount of privilege than the privilege floor is restricted from accessing the file. In this embodiment, a user having a privilege of only viewing a file may not have access to a restricted file having a privilege floor of editing the file.

In one embodiment, restricting access to a sensitive file may include hiding the file from an unauthorized access. In one embodiment, hiding the file may include redirecting an unauthorized user to another file in any location of the system 10 when the unauthorized user tries to access the sensitive file.

In one embodiment, restricting access to the file may also include activating an alarm to indicate when an unauthorized access is occurring. In one embodiment, the restricting system 24 may execute site specific commands to gather evidence of what actions an unauthorized user is performing when the unauthorized user is trying to access the sensitive file. The restricting system 24 may execute the site specific commands to gather evidence without exposing the file to the unauthorized user.

In one embodiment, restricting access to the file may include granting identifiers to a file opening process for the file at the time the file is opened and then revoking the identifiers when the file is closed. In one embodiment, the restricting system 24 may prevent a covert code from running in association with the sensitive file. In one embodiment, preventing the covert code from running may include attaching a crypt checksum to the file. In one embodiment, preventing the covert code from running may include attaching a privilege mask to the file.

In one embodiment, full network awareness may be implemented so that an extended access control is very powerful. Cross-network checks for access control may be performed. In one embodiment, distributed firewall checks of access rates may be performed for access control and alarms, providing statistical quality control. Checks can be done of the access frequency of users to files. For example, a clerk who normally must access a customer file to answer phone queries might access a few hundred customer records per day. By watching access frequencies, a clerk accessing thousands of customer records per day might be flagged, since he might be doing this access for unauthorized purposes. Checks of network operations may be used to control files as they are created or inherited from a directory protection profile.

A database management system may be used as a lookup agent. The "change dir" command may be overloaded so that some preselected patterns might imply looking for files flagged with some security labels when seen, instead of selecting file names only, which could allow selection of more attributes including security attributes. This may speed up finding of content. In one embodiment, search engine techniques may be used to populate the database management system. In one embodiment, the database management system may also return "not-yet-classified" files in directory lists. The system may allow full soft linking and full conditioned soft links, not just on access fail. These access control methods, are published in the program Safety, published on the DECUS VMS SIG tapes in 1996. Softlinks are also known to Unix users as "symbolic links".

Figure 4:
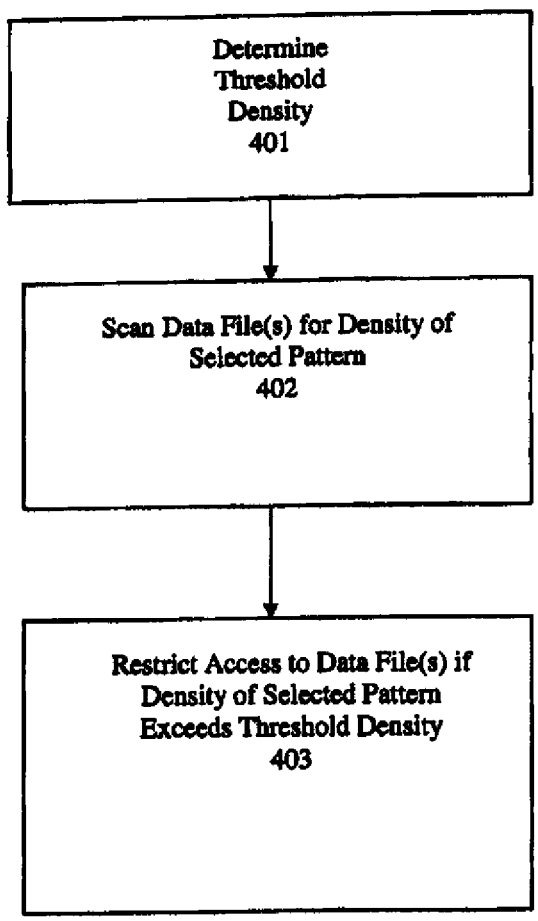
FIG. 4 is a flow diagram illustrating another embodiment of a method for filtering files according to the invention.

FIG. 4 depicts a flow diagram illustrating another embodiment of a method for filtering files according to the invention. At step 401, the density threshold of a selected pattern is determined by, for example, a processor capable of making a density threshold determination. This determination may be made by, for example, analyzing a data file or by performing an algorithm on one or more data files. At 402, a scanning module scans data files in system 10 and determines the density of a selected pattern. This determination may be made as described previously with relation to FIG. 3. At step 403, the system 10 may optionally perform further analysis on the data in the identified files that correspond to the selected pattern. At step 404, the restricting system 24 may restrict access to each file that is determined to likely contain sensitive data based on the density of the selected pattern and optional further analysis of the data that correspond to the selected pattern. This access restriction may comprise password protection of the data file, time of day, user type, place of access, file authorization, privileges authorization or encryption.

As was described in relation to FIG. 3, the various processes illustrated in FIG. 4 may be performed by a system, such as the system illustrated in FIGS. 1 and 2.

A system and method for filtering files is described where the files may stay at the location in which they are stored. Thus, there is no need to add large databases or use additional memory in existing databases to store the files found to include sensitive data. A method for filtering files is described where each file does not have to be read by an individual to determine whether the file contains sensitive data. Thus, the speed of file filtering is greatly increased by using a program to scan documents for selected pattern strings.

While the foregoing description includes many details and specificities, it is to be understood that these have been included for purposes of explanation only, and are not to be interpreted as limitations of the invention. Many modifications to the embodiments described above can be made without departing from the spirit and scope of the invention, as is intended to be encompassed by the following claims and their legal equivalents.

What is claimed is:

1. A computer implemented method of preventing wrongful use of information stored in a computer system of an enterprise, the method comprising:
   providing a computer system including a database comprising data files, wherein the data files contains restricting criteria comprising one or more of customer names, addresses, zip codes, contact information, dates of birth, social security numbers, and financial account numbers of one or more of bank accounts, credit card accounts, and debit card accounts, wherein multiple users are authorized by the enterprise to access the system;
   selecting a key word string, by at least one or more computer processors, comprising an alphanumeric string including at least a portion of numeric data identifying a financial account comprising one or more of bank accounts, credit card accounts, and debit card accounts;
   scanning, by the at least one or more computer processors, a plurality of files for instances of the key word string;
   determining, by the at least one or more computer processors, for each of the plurality of files, a density of the selected key word string by dividing a number of occurrences of the key word string by a size of the respective one of file of the plurality of files;
   calculating, by the at least one or more computer processors and based on the determined density, a check digit from the numeric data in the plurality of files that correspond to the key word string;
   validating, by the at least one or more computer processors, the files by comparing the calculated check digit to the numeric data in the files that correspond to the key word string; identifying, based on the results of the validation, special files by the at least one or more computer processors; and
   restricting access to the identified special files by performing, by the at least one or more computer processors, at least one of the steps comprising:
      (1) activating an alarm to indicate when unauthorized access to one or more of the special files is occurring or has occurred;
      (2) password protecting one or more of the special files;
      (3) controlling access to one or more of the identified special files based on one or more of user type, place of user access, user file authorization, and user privileges authorization;
      (4) executing site specific commands wherein the site specific commands gather evidence of what actions an unauthorized user is undertaking or undertook without exposing one or more of the special files to the unauthorized user;
      (5) granting at least one identifier to a file opening process for one or more of the special files and revoking the identifier when one or more of the special files are closed;
      (6) preventing covert code from running in association with one or more of the special files by attaching at least one of a crypt checksum and a privilege mask to one or more of the special files; and
      (7) encrypting one or more of the special files.

2. The method of claim 1, wherein the validating further includes determining, by the at least one or more computer processors, whether a density of occurrence of the key word string in files that comprise the key word string is greater than a threshold density.

3. The method of claim 1, further including protecting the special files by moving the identified special files to a secure location.

4. The method of claim 1, wherein the key word string comprises a credit card number.

5. The method of claim 1, wherein access to the special files is restricted only in the event a ratio of special files having a valid check digit to the identified files having no valid check digit exceeds a predetermined ratio.

6. The method of claim 1, wherein access to the special files is restricted only in the event a percentage of special files having a valid check digit exceeds a percentage that would be found in a random collection of data.

7. A computer implemented method of preventing wrongful use of information stored in a computer system of an enterprise, the method comprising:

providing a computer system including a database comprising data files, wherein the data files contain restricting criteria comprising one or more of customer names, addresses, zip codes, contact information, dates of birth, social security numbers, and financial account numbers of one or more of bank accounts, credit card accounts, and debit card accounts, wherein multiple users are authorized by the enterprise to access the system;

selecting, by at least one or more computer processors a special pattern comprising: a key word string comprising an alphanumeric string including at least a portion of the numeric data identifying a financial account comprising one or more of bank accounts, credit card accounts, and debit card accounts; and a second string structured for identifying one or more of customer names, addresses, zip codes, contact information, dates of birth, and social security numbers;

scanning, by the at least one or more computer processors, a plurality of files for instances of the key word string;

determining, by the at least one or more computer processors, for each of the plurality of files, a density of the selected key word string by dividing a number of occurrences of the key word string by a size of the respective one of file of the plurality of files;

calculating, by the at least one or more computer processors and based on the determined density, a check digit from the numeric data in the plurality of files that correspond to the key word string;

validating, by the at least one or more computer processors, the files by comparing the calculated check digit to the numeric data in the determined files that correspond to one or both of the first keyword string and the second string;

identifying, based on the results of the validation, special files, by the at least one or more computer processors; and restricting access to the identified special files by performing, by the at least one or more computer processors, at least one of the steps comprising:
(1) activating an alarm to indicate when unauthorized access to one or more of the special files is occurring or has occurred;
(2) password protecting one or more of the special files;
(3) controlling access to one or more of the identified special files based on one or more of user type, place of user access, user file authorization, and user privileges authorization;
(4) executing site specific commands wherein the site specific commands gather evidence of what actions an unauthorized user is undertaking or undertook without exposing one or more of the special files to the unauthorized user;
(5) granting at least one identifier to a file opening process for one or more of the special files and revoking the identifier when one or more of the special files are closed;
(6) preventing covert code from running in association with one or more of the special files by attaching at least one of a crypt checksum and a privilege mask to one or more of the special files; and
(7) encrypting one or more of the special files.

8. The method of claim 7, further comprising determining a selected threshold density by averaging the density of the occurrence of the key word string for all the data files in the database.

9. The method of claim 7, further comprising wherein access to the special files is restricted only in the event the ratio of special files having a valid check digit to the identified files having no valid check digit exceeds a predetermined ratio.

10. The method of claim 7, wherein access to the special files is restricted only in the event the percentage of special files having a valid check digit exceeds the percentage that would be found in a random collection of data.

11. A computer system for confidential information wherein multiple users are authorized to access the system, the system comprising:
a database comprising data files, wherein the data files contains restricting criteria comprising one or more of customer names, addresses, zip codes, contact information, dates of birth, social security numbers, and financial account numbers of one or more of bank accounts, credit card accounts, and debit card accounts;
at least one computer processor; and
a memory device storing computer executable instructions, when executed by the at least one computer processor, cause the at least one computer to perform the method comprising:
selecting a key word string comprising an alphanumeric string including at least a portion of the numeric data identifying a financial account comprising one or more of bank accounts, credit card accounts, and debit card accounts;
scanning a plurality of files for instances of the occurrence of the key word string;
determining for each of the plurality of files, a density of the selected key word string by dividing a number of occurrences of the key word string by a size of the respective one of file of the plurality of files;
calculating, based on the determined density, a check digit from the numeric data in the plurality of files that correspond to the keyword string;
validating the files by comparing the calculated check digit to the numeric data in the determined files that correspond to the keyword string; and
identifying, based on the results of the validation, special files; and
restricting access to the identified special files by performing at least one of the steps comprising:
(1) activating an alarm to indicate when unauthorized access to one or more of the special files is occurring or has occurred;
(2) password protecting one or more of the special files;
(3) controlling access to one or more of the identified special files based on one or more of user type, place of user access, user file authorization, user privileges authorization;
(4) executing site specific commands wherein the site specific commands which gather evidence of what actions an unauthorized user is undertaking or undertook without exposing one or more of the special files to the unauthorized user;
(5) granting at least one identifier to a file opening process for one or more of the special files and revoking the identifier when one or more of the special files are closed;
(6) preventing covert code from running in association with one or more of the special files by attaching at least one of a crypt checksum and a privilege mask to one or more of the special files; and (7) encrypting one or more of the special files.

12. The computer system of claim 11, wherein the at least one computer processor for selecting a key word string and the at least one computer processor for restricting access to the identified special files are separate processors.

13. The computer system of claim 11, wherein the at least one computer processor for selecting a key word string and the at least one computer processor for restricting access to the identified special files are the same processor.

14. The computer system of claim 11, wherein the first keyword string comprises a credit card number.

15. The computer system of claim 11, wherein encrypting the special files comprises public key encryption.

16. The computer system of claim 11, wherein the at least one processor is further for determining the density of identified files in the database and for calculating the check digit for each identified file only in the event the number of identified files in the database exceeds a predetermined threshold density.

17. The computer system of claim 11, wherein the at least one processor is further for restricting access to the identified special files only in the event a ratio of special files having a valid check digit to the identified files having no valid check digit exceeds a predetermined ratio.

18. The computer system of claim 11, wherein the at least one processor is further for restricting access to the identified special files only in the event a percentage of special files having a valid check digit exceeds a percentage that would be found in a random collection of data, such percentage constituted by a predetermined value.

* * * * *